(12) United States Patent
Okada

(10) Patent No.: US 7,706,445 B2
(45) Date of Patent: Apr. 27, 2010

(54) IMAGE PROCESSING EMPLOYING PICTURE TYPE CONVERSION

(75) Inventor: Shigeyuki Okada, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 1885 days.

(21) Appl. No.: 10/157,249

(22) Filed: May 28, 2002

(65) Prior Publication Data

US 2002/0181588 A1 Dec. 5, 2002

(30) Foreign Application Priority Data

May 31, 2001 (JP) .............................. 2001-165942

(51) Int. Cl.
*H04N 7/12* (2006.01)
(52) U.S. Cl. ............................... 375/240.15
(58) Field of Classification Search ............ 375/240.01, 375/240.12, 240.25, 240.26, 240.15; *H04N 7/12*
See application file for complete search history.

(56) References Cited

U.S. PATENT DOCUMENTS 5,754,239 A * 5/1998 Wilkinson ............. 375/240.15

FOREIGN PATENT DOCUMENTS

| JP | H08-111870 A | 4/1996 |
|---|---|---|
| JP | 07-044428 | 9/1996 |
| JP | 08-166812 | 2/1997 |
| JP | 10-285047 A | 10/1998 |
| JP | 10-003433 | 7/1999 |
| JP | 11-252507 | 9/1999 |
| JP | H11-308622 A | 11/1999 |

OTHER PUBLICATIONS

Office Action (with English translation) issued on Jun. 10, 2005, in Chinese Patent Application No. 02122053.0, filed in May 31, 2002.
Office Action (with English translation) issued on Dec. 24, 2004, in Chinese Patent Application No. 02122065.4, filed May 31, 2002.
Office Action (with English translation) issued on Sep. 17, 2004, in Chinese Patent Application No. 0212054.9, filed May 31, 2002.
Office Action issued on Japanese Patent Application No. 2000-370469, with English translation, Oct. 18, 2002.
Office Action issued on Japanese Patent Application No. 2000-370517, with English translation, Oct. 18, 2002.
Office Action issued on Japanese Patent Application No. 2000-370562, with English translation, Oct. 18, 2002.
Office Action issued on Japanese Patent Application No. 2000-370596, with English translation, Oct. 18, 2002.
Office Action issued on Japanese Patent Application No. 2000-370622, with English translation, Oct. 18, 2002.

* cited by examiner

*Primary Examiner*—Young Lee

(57) ABSTRACT

When a reverse reproduction is instructed, B pictures and P pictures in an MPEG video stream are once decoded and are again recoded into B pictures by an MPEG video encoder. Combined with I picture in the MPEG video stream, thereafter, a recoded data sequence comprised of I pictures and B pictures is generated, so as to be overwritten in a storage area of a hard disk. An MPEG video decoder reads out this recoded data sequence in a reverse time-series manner, and decodes this successively and outputs it to a display circuit.

16 Claims, 12 Drawing Sheets

IMAGE PROCESSING EMPLOYING PICTURE TYPE CONVERSION

BACKGROUND OF THE INVENTION

1. Field of the Invention

The present invention relates to an image processing method, and an image processing apparatus and a television which can utilize this image processing method. The present invention relates to technology in which to process data coded according to, for example, the MPEG (Moving Picture Expert Group) standards.

2. Description of the Related Art

Information handled in the multimedia is of a vast amount and is multifarious, thus a fast processing of the information is necessary in the course of planning to put the multimedia to practical use. In order to process information at high speed, compression and expansion of data become indispensable. The "MPEG" method is one of data compression and expansion techniques. This MPEG method is being standardized by the MPEG Committee (ISO/IEC JTC1/SC29/WG11) under the ISO (International Organization for Standardization)/IEC (International Electro-technical Commission). An image processing apparatus utilizing the MPEG method is built into various image related devices such as movie camera, still camera, television set, video CD reproduction equipment, DVD reproduction equipment and so forth.

Video data handled in the MPEG relate to moving pictures, and the moving picture is constituted by a plurality of, for example, 30 frames, per second that are still pictures or frames. As shown in FIG. 1, the video data have a hierarchical structure and are comprised of six layers that are a sequence layer, a GOP (group of pictures) layer, a picture layer, a slice layer, a macroblock layer and a block layer in this order. The number of the slices constituting a single picture is not fixed, and the number of the macroblocks constituting a single slice is also not fixed. The macroblock layer and the block layer are omitted in FIG. 1.

Moreover, MPEG is chiefly classified under two methods, namely, MPEG-1 and MPEG-2, according to the coding rates. In MPEG-1, a frame corresponds to a picture. In MPEG-2, however, frames or fields can also be made to correspond to pictures. Two fields constitute one frame. The structure where frames correspond to pictures is called a frame structure, whereas the structure where fields correspond to pictures is called a field structure.

In MPEG, a compression technique called inter-frame prediction is employed. The inter-frame prediction compresses inter-frame data based on a temporal correlation among frames. In the inter-frame prediction, bidirectional prediction is performed. The bidirectional prediction uses both forward prediction for predicting a current reproduced image from a past reproduced image or picture, and backward prediction for predicting a current reproduced image from a future reproduced image.

This bidirectional prediction uses three types of pictures that are I picture (Intra-Picture), P picture (Predictive-Picture) and B picture (Bidirectionally predictive-Picture). An I picture is an image independently produced by an intra-frame coding processing, irrespective of past and future reproduced images. In order for a random access to be performed, at least one I picture is needed within the GOP. All of the macroblock type within the I picture are intra-frame prediction pictures (Intra-Frames). A P picture is produced by the inter-frame coding processing using the forward prediction that is prediction from a past I or P picture. The macroblock type in the P picture includes both an intra-frame prediction picture and a forward prediction picture (Forward Inter Frame).

The B picture is produced by the inter-frame coding processing using the bidirectional prediction. In the bidirectional prediction, a B picture is produced by one of the following three predictions.

(1) Forward Prediction; prediction from a past I picture or P picture.

(2) Backward Prediction; prediction from a future I picture or P picture.

(3) Bidirectional Prediction; prediction from past and future I picture or P picture.

The macroblock type in the B picture includes four types of pictures that are an intra-frame prediction picture, a forward prediction picture, a backward prediction picture (Backward Inter Frame), and an interpolative prediction picture (Interpolative Inter Frame).

These I, P and B pictures are respectively coded. Namely, the I picture can be generated even when no past or future picture is available. In contrast thereto, the P picture can not be generated without the past picture, and the B picture can not be generated without the past or future pictures. However, when the macroblock type is the interpolative prediction picture for the P and B picture, the macroblock is produced even without the past or future pictures.

In the inter-frame prediction, an I picture is periodically produced first. Then, a frame several frames ahead of the I picture is produced as a P picture. This P picture is produced by prediction in one direction from the past to the present, namely, in the forward direction. Thereafter, a frame located before the I picture and after the P picture is produced as a B picture. When producing this B picture, the optimal prediction method is selected from among the three prediction methods which are the forward prediction, backward prediction and bidirectional prediction. In general, a current image and its preceding and succeeding images in consecutive motion pictures are similar to one another, and they differ only partially. Thus, it is assumed that the previous frame and the next frame are substantially the same. If there is a difference between the two frames, that difference only is extracted and compressed. For example, if the previous frame is an I picture and the next frame is a P picture, the difference is extracted as B picture data. Thereby, the inter-frame data can be compressed based on the temporal correlation among frames. A data sequence or a bit stream of video data coded in compliance with the MPEG video part is called an MPEG video stream.

MPEG-1 is designed mainly for storage media such as video CD (Compact Disc) or CD-ROM (CD Read Only Memory). MPEG-2, on the other hand, is designed not only for storage media such as video CD, CD-ROM, DVD (Digital Video Disk) and VTR (Video Tape Recorder) but also for transmission media in general including communication media such as LAN (Local Area Network) and broadcast media such as the ground wave broadcast, satellite broadcast and CATV (Community Antenna Television).

A core of technology used in the MPEG video part lies in a motion compensated prediction (MC) and a discrete cosine transform (DCT). The coding technique combining MC and DCT is called the hybrid coding technique. The DCT (also referred to as a FDCT (forward DCT)) is utilized in the MPEG video part at the time of the coding, so that video signals of the images are decomposed into frequency components so as to be processed. Thereafter, at the time of a decoding, the frequency components are again restored to video signals by using an inverse discrete cosine transform (inverse DCT or IDCT).

The MPEG can process a vast amount of information at high speed and the MPEG uses the compression technique called the inter-frame prediction as described above. Thus, it is extremely difficult to reverse-reproduce a data sequence, for the purpose of a picture search, which is coded and recorded in a time series manner according to the MPEG, namely, it is extremely difficult to reproduce a recorded data series by simply going back along the time axis in the case of reproduction in the reverse direction as in the usual video tape recorder. Thus, it is conventionally performed that I picture alone allotted in each GOP is reproduced by going back along the time axis. Since the I picture is an image produced by the intra-frame coding processing as described above, it can be independently displayed without referring to pictures before and/or after it.

In the conventional examples, the number of the I picture allotted for each GOP is very small. For example, the number of the I picture allotted for each GOP is at most one among pictures constituting the GOP, and when the picture of per 15 to 30 frames is reverse reproduced, a smooth reverse-reproduced picture as in the usual video tape recorder is not obtained, so that it is difficult to stop at a desired scene at a proper timing.

SUMMARY OF THE INVENTION

The present invention has been made in view of foregoing circumstances, and an object thereof is to provide an image processing technique capable of obtaining smooth reverse-reproduced pictures. In order to achieve this object and other objects which will become clear in this patent specification, the present invention intends to solve problems in the technique relating principally to the coding and decoding processing of images.

A preferred embodiment according to the present invention relates to an image processing apparatus. This apparatus comprises: a converter which converts a first coded data sequence, which includes I pictures, P pictures and B pictures coded in compliance with MPEG, to a second coded data sequence comprised of I pictures and B pictures; a back-end decoder which decodes the second coded data sequence, generated by the converter, in a reverse time-series manner; and a controller which controls operations of the converter and decoder, wherein the converter includes: a front-end decoder which decodes at least the P pictures among the first coded data sequence; an encoder which codes data, decoded by the front-end decoder, as B pictures according to MPEG; and a storage which stores the second coded data sequence. The front-end decoder corresponds to a first decoder whereas the back-end decoder corresponds to a second decoder in the present invention.

Another preferred embodiment according to the present invention relates also to an image processing apparatus. This apparatus comprises: a converter which converts a first coded data sequence, which includes I pictures, P pictures and B pictures coded in compliance with MPEG, to a second coded data sequence comprised of I pictures and B pictures; a back-end decoder which decodes the second coded data sequence, generated by the converter, in a reverse time-series manner; and a controller which controls operations of the converter and decoder, wherein the converter includes: a front-end decoder which decodes at least the B pictures and P pictures among the first coded data sequence; an encoder which codes data, decoded by the front-end decoder, as B pictures according to MPEG; and a storage which stores the second coded data sequence.

In these preferred embodiments, the image processing apparatus may further comprise an allocation controller which allocates I pictures included in the first coded data sequence, as the I pictures included in the second coded data sequence, wherein the allocation controller allocates the I pictures, as they are, without being subjected to processings by the front-end decoder and the encoder.

The first coded data sequence may be data coded in a manner that the pictures are allocated in a predetermined sequence, in a predetermined unit of group. In that case, each processing by the converter and the back-end decoder may be performed in the predetermined unit of group, and the converter may code, as B pictures, image data obtained by decoding P pictures among a coded data sequence of a certain group, by referring to I pictures included in said certain group and I pictures included in a next group thereto. Moreover, the converter may code, as B pictures, image data obtained by decoding B pictures and P pictures among a coded data sequence of a certain group, by referring to I pictures included in said certain group and I pictures included in a next group thereto.

The back-end decoder may read out the second coded data sequence in a reverse time-series manner and perform a reverse time-series decoding in a manner such that, as to B pictures included in the second coded data sequence, pictures to be front referred to and those to be back referred to are reversed. The encoder may store the second coded data sequence in the storage in a reverse time-series order and perform a reverse time-series decoding in a manner that B pictures included in the second coded data sequence are so coded that pictures to be front referred to and those to be back referred to are reversed. The front-end decoder and the back-end decoder may be put to common use in terms of hardware.

Still another preferred embodiment according to the present invention relates to an image processing method. This method includes: converting a first coded data sequence which includes I pictures, P pictures and B pictures coded in compliance with MPEG, to a second coded data sequence comprised of I pictures and B pictures; and decoding the second coded data sequence in a reverse time-series manner, wherein the converting codes according to MPEG, as B pictures, at least the P pictures among the first coded sequence.

Still another preferred embodiment according to the present invention relates also to an image processing method. This method includes: converting a first coded data sequence which includes I pictures, P pictures and B pictures coded in compliance with MPEG, to a second coded data sequence comprised of I pictures and B pictures; and decoding the second coded data sequence in a reverse time-series manner, wherein the converting codes according to MPEG, as B pictures, at least the B picture and P picture among the first coded data sequence.

I pictures included in the first coded data sequence may be allocated, as they are, as I pictures included in the second coded data sequence. The second coded data sequence may be read out from a storage in a reverse time-series manner and, at the same time, a reverse time-series decoding may be performed in a manner such that, as to B pictures included in the second coded data sequence, pictures to be front referred to and those to be back referred to are reversed. The second coded data sequence may be stored in the storage in a reverse time-series order and, at the same time, a reverse time-series decoding may be performed in a manner that B pictures included in the second coded data sequence are so coded that pictures to be front referred to and those to be back referred to are reversed.

Moreover, there may be provided a television receiver equipped with any one of the above-described image processing apparatuses, wherein reproduction of images in a reverse time-series manner is included as part of operational specifications thereof.

It is to be noted here that the terms "I picture", "B picture" and "P picture" used in the patent specification correspond to and encompass the concept of "I-VOP (Video Object Plane)", "B-VOP" and "P-VOP", respectively, in MPEG-4.

In any case of the above described, the coding or the decoding, and a processing accompanied by these as the case may be, may be performed in a predetermined unit of group. Moreover, different combinations of the above-described arbitrary structural components and processing processes and so forth, as well as expressions, used in the present invention, transferred between a method, an apparatus, a system, a computer program, a recording medium and so forth are still effective as and encompassed by embodiments of the present invention.

Moreover, this summary of the invention does not necessarily describe all necessary features so that the invention may also be sub-combination of these described features.

DETAILED DESCRIPTION OF THE INVENTION

The invention will now be described based on the preferred embodiments, which do not intend to limit the scope of the present invention, but exemplify the invention. All of the features and the combination thereof described in the embodiment are not necessarily essential to the invention.

The processings common to some of the embodiments are forward image reproduction and reverse image reproduction. For the convenience of description, "forward" and "reverse" and their synonyms in the following description should be understood to apply to the order when pictures comprising an image are finally put in a form for display. Hence, unless otherwise indicated, the order of pictures represents the state of display.

Various component members appear in the following embodiments. In terms of hardware, those embodiments can be realized by a CPU, memory and other LSIs and combined circuit. In terms of software, they are realized by memory-loaded programs or the like with image processing functions. The following description mainly concerns functions that are realized in cooperation with such components. Therefore, it should be understood by those skilled in the art that these functions can be realized in a variety of forms by hardware only, software only or by the combination thereof. An image reproduction apparatus is an example of an "image processing apparatus" according to the present invention.

First Embodiment

FIGS. 2A-2D show an outline of procedures for reverse reproduction of images. An outline of the first embodiment according to the present invention will be described referring to FIGS. 2A-2D. As shown in these figures, the reverse reproduction includes a procedure containing four steps A-D. There can be a variety of combinations of MPEG video streams in terms of the order of I, P and B pictures. For the simplicity of description hereinafter, however, the video stream is to be "$I_0 P_2 B_1 P_4 B_3 P_6 B_5 P_8 B_7 I_{10} B_9 P_{12} B_{11} \ldots$" and the display order of pictures, on the other hand, is determined to be "$I_0 B_1 P_2 B_3 P_4 B_5 P_6 B_7 P_8 B_9 I_{10} B_{11} P_{12} \ldots$"

Figure 1:
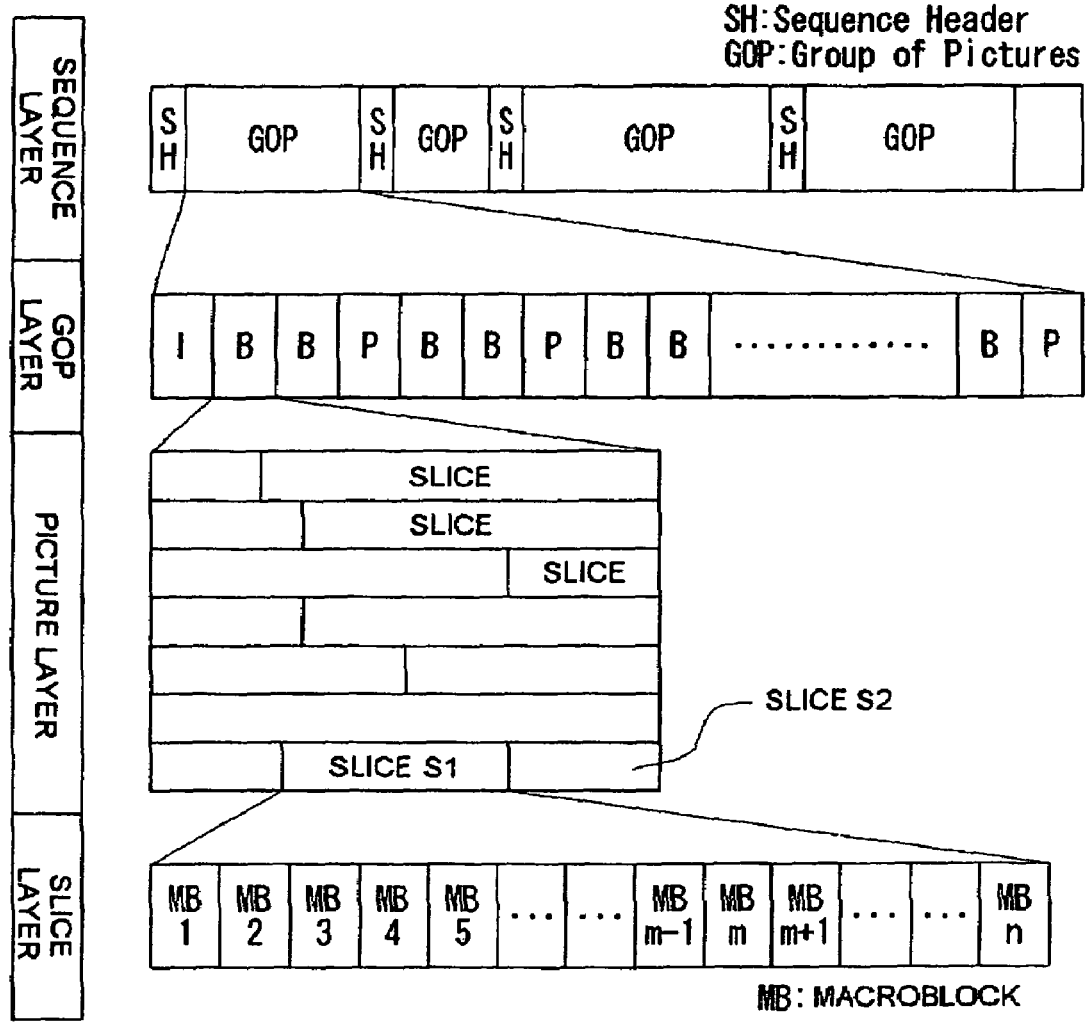
FIG. 1 shows a hierarchical structure of MPEG video stream.
Figure 2:
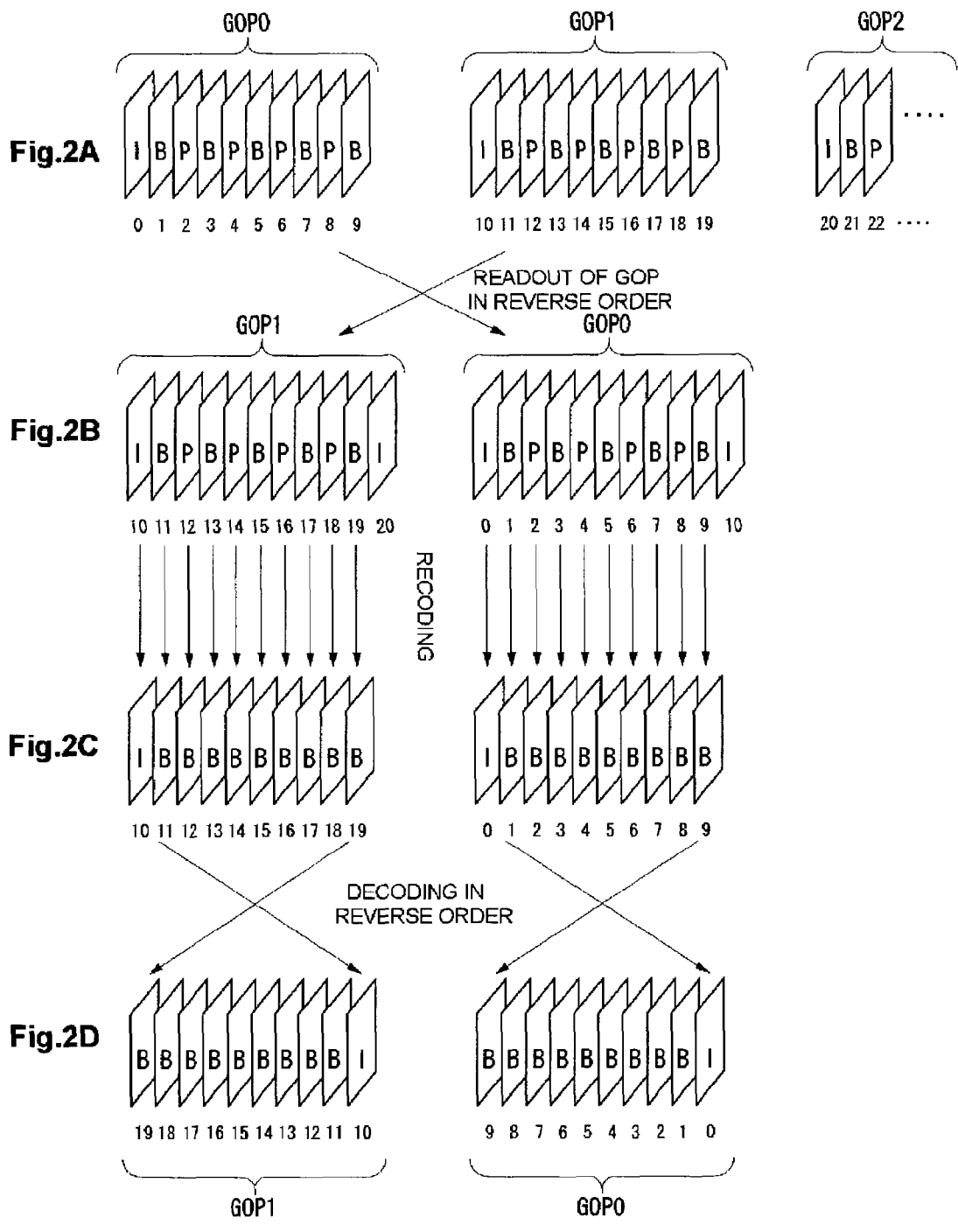
FIGS. 2A-2D are schematic diagrams showing procedures for reverse reproduction of images according to a first embodiment of the present invention.

FIG. 2A shows an MPEG video stream at the time of forward reproduction. This stream includes pictures in the order of $GOP_0$, $GOP_1$ and $GOP_2$. The $GOP_0$ includes pictures which are "$I_0 B_1 P_2 B_3 P_4 B_5 P_6 B_7 P_8 B_9$" in the display order, whereas The $GOP_1$ includes pictures which are "$I_{10} B_{11}, P_{12} B_{13} P_{14} B_{15} P_{16} B_{17} P_{18} B_{19}$" in the display order.

FIG. 2B shows an MPEG video stream to be read out at the time of reverse reproduction. In the reverse reproduction, the order of GOPS in the MPEG video stream is reversed and the stream is read out in units of GOP, and, at the same time, pictures within each GOP are decoded in a forward direction, that is, in a time series manner. Then, an I picture included in a next GOP is made to be included in the GOP from which pictures are to be read out. For example, suppose that pictures of $GOP_1$ are the ones to be read out. Then, an I picture $I_{20}$ which is located at the head of $GOP_2$ is added to the end of $GOP_1$. Thus, both the head and the end of $GOP_1$ are constituted by I pictures, respectively, so that P pictures and B pictures lie between the I pictures and are interposed by these I pictures.

FIG. 2C shows a recoded MPEG video stream. The I pictures in FIG. 2B are coded again into I pictures, and pictures other than the I pictures, that are, P pictures and B pictures are all coded into B pictures. At the time of coding into B pictures, two I pictures at the head and end of the GOP are referred to. As for the I picture added to each GOP in FIG. 2B, the recoding step in the GOP is skipped. For example, when coding $GOP_1$, an I picture $I_{20}$ is discarded, and when coding $GOP_0$, an I picture $I_{10}$ is discarded.

FIG. 2D shows an MPEG video stream to be redecoded. At this stage of a redecoding, the order of pictures within each GOP is reversed for each GOP and then those pictures are decoded. Thus, an arrangement in the reverse order is realized as the general order of reproduction of pictures. The term "reverse" of GOPs added in the "reverse" reproduction at the time of recoding is mainly concerned with the second-time decoding.

Figure 3:
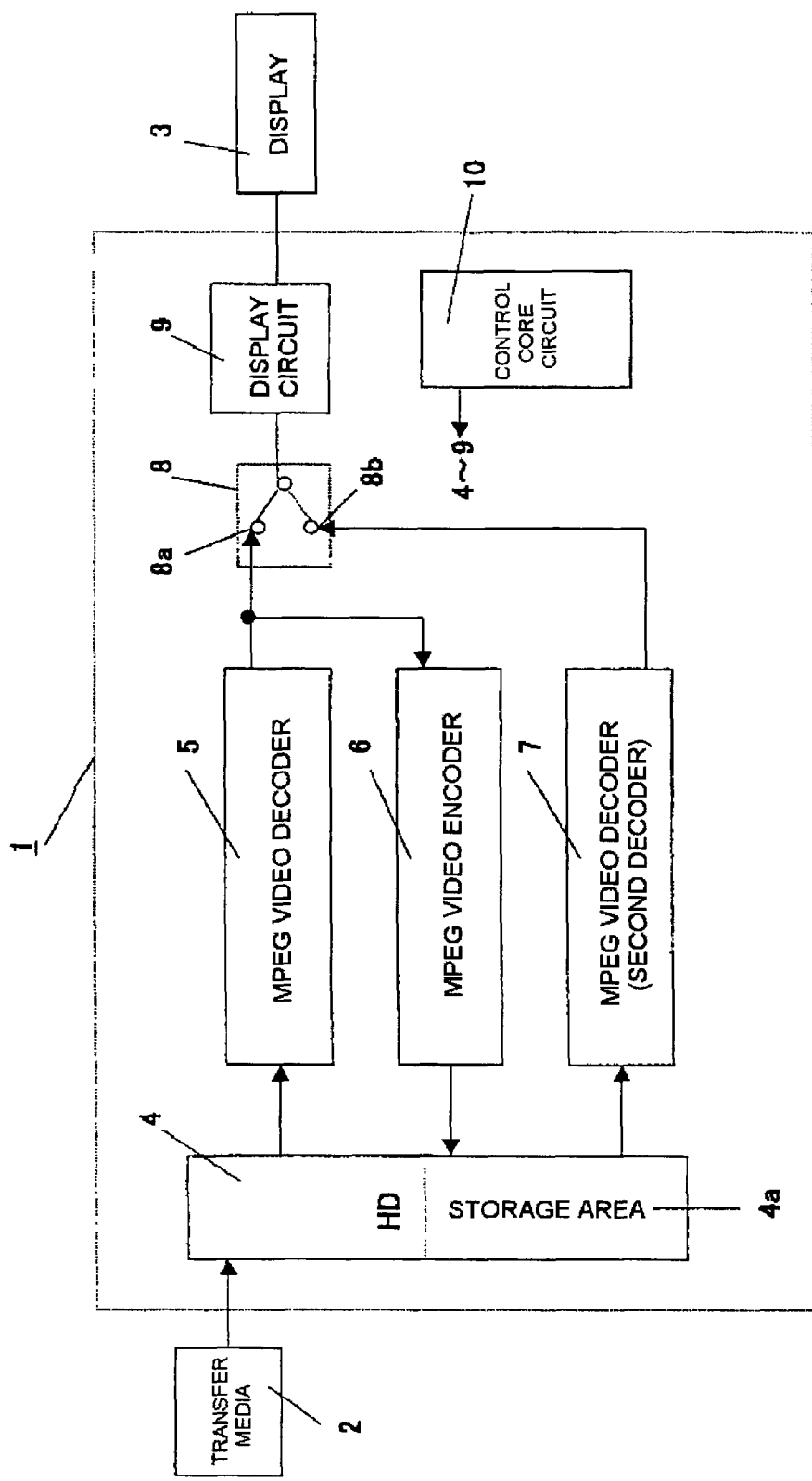
FIG. 3 is a block circuit diagram of an image reproducing apparatus according to the first embodiment.

FIG. 3 shows a block circuit of an image reproducing apparatus 1 according to a first embodiment. This image reproducing apparatus 1 is incorporated into a movie camera, a still camera, a television, a video CD reproduction apparatus or a DVD reproduction apparatus, which outputs the MPEG video stream from a transfer medium 2 to a display 3. The transfer medium 2 includes storage medium (video CD, CD-ROM, DVD, VTR and so forth), communication medium (LAN and so forth) and broadcasting medium (ground wave broadcasting, satellite broadcasting, CATV and so forth). Moreover, when the data from a storage medium or broadcasting medium are the data which are not coded according to the MPEG video part, the transfer medium also includes an MPEG video encoder which carries out the coding of the digital data. When the image reproducing apparatus 1 is incorporated into a movie camera or a still camera, the transfer medium 2 is replaced by an image pickup device, such as a CCD, and its signal processing circuit.

In FIG. 3, the image reproducing apparatus 1 comprises a hard disk (HD) 4, an MPEG video decoder 5 (hereinafter referred to simply as a "decoder 5" also), an MPEG video encoder 6 (hereinafter referred to simply as an "encoder 6", also), a second MPEG video decoder 7 (hereinafter referred to simply as a "second decoder 7" also), a switching circuit 8, a display circuit 9 and a control core circuit 10. The whole or the main part of the image reproducing apparatus 1 may be mounted on a single chip of LSI, and this applies to other embodiments. The control core circuit 10 controls the operation of the decoder 5, the second decoder 7, the encoder 6 and each component of the image reproducing apparatus 1. The hard disk 4, which is comprised of a magnetic disk, stores video streams transferred from the transfer medium 2 successively. The hard disk 4 is provided with a special storage area 4a within it.

The decoder 5 reads out a plurality of pictures from the hard disk 4 in units of group. At the time of forward reproduction, pictures for each GOP are read out in a time-series GOP order, in accordance with a control of the control core circuit 10. The time-series GOP order is, for example, $GOP_0$, $GOP_1$ and $GOP_2$ or the like order. The decoder 5 decodes, in a time-series picture order, the GOP-by-GOP pictures read out in the time-series GOP order.

At the time of reverse reproduction, the decoder 5 read out pictures for each GOP in a reverse time-series GOP order, in accordance with a control of the control core circuit 10. The reverse time-series GOP order is, for example, $GOP_2$, $GOP_1$ and $GOP_0$ or the like order. Then, the decoder 5 also reads out the I picture located at the head of the next GOP in addition to the GOP from which pictures are to be read out. This I picture is needed for recoding B pictures. The decoder 5 decodes, in the time-series picture order, the GOP-by-GOP pictures read out in the reverse time-series GOP order.

The switching circuit 8 switches its connection to a first node 8a side or a second node 8b side according to a control by the control core circuit 10. When the switching circuit 8 is connected to the first node 8a side, forward reproduction is performed, in which a reproduced image data sequence produced by the decoder 5 is inputted, as kept intact, to the display circuit 9. When connected to the second node 8b side, data from the second decoder 7 are inputted to the display circuit 9 to perform reverse reproduction as described later.

The display circuit 9 produces an image video signal from picture data transferred from the decoder 5 or the second decoder 7 and outputs this to the display 3 which is connected to the image reproducing apparatus 1.

A reproduced image data sequence generated by the decoder 5 is further inputted to the encoder 6 also, and is recoded there. In the encoder 6, the reproduced image data sequence generated by the decoder 5 is coded picture by picture as an I picture which is an intra-frame coded image, or is coded as B pictures which are bidirectionally predictive coded images. More specifically, the encoder 6 codes data obtained by decoding I pictures, into I pictures again, and codes data obtained by decoding data other than the I pictures, that are, P pictures and B pictures, into B pictures. As an I picture to be back-referred to in the course of coding into B pictures, an I picture added to the GOP from the next GOP is utilized.

In order to determine which pictures among I pictures and B pictures to be recoded, the control core circuit 10 may control the encoder 6 in a manner such that a picture at the head for each GOP is coded into an I picture and the subsequent pictures are coded into B pictures. The recoding of the I picture made to included in each GOP may be so controlled that the recoding of this I picture is skipped in order to avoid a possible overlapping with a picture of the next GOP.

The reproduced image data sequence generated by the decoder 5 is stored in the storage area 4a allocated within the hard disk 4 after it is coded into I pictures or B pictures in units of picture by the encoder 6. The capacity of this storage area 4a is sufficient if it is equivalent to one GOP of the MPEG video stream to be inputted. It is to be noted that the storage area 4a is an example of a "storage" in the present invention.

The second decoder 7 reads out pictures included in recoded data sequences stored in the storage area 4a in the reverse time-series picture order, so as to be decoded. Thereby, a reproduced image data sequence is generated, and reverse reproduction is realized. This reproduced image data sequence is inputted to the display circuit 9 from the second node 8b of the switching circuit 8.

Figure 4:
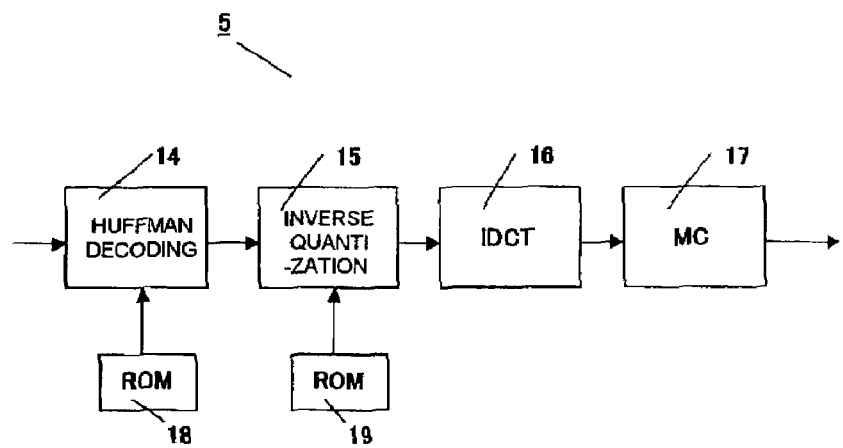
FIG. 4 is a schematic block diagram showing a decoder according to the first embodiment.

FIG. 4 is a block diagram showing a structure of the decoder 5. Referring to FIG. 4, the decoder 5 comprises a Huffman decoding circuit 14, an inverse quantization circuit 15, and an IDCT (Inverse Discrete Cosine Transform) circuit 16, an MC (Motion Compensated prediction) circuit 17, and ROMs (Read Only Memory) 18 and 19. It is to be noted that the decoder is an example of a "front-end decoder" in the present invention.

The Huffman decoding circuit 14 carries out variable-length decoding of the pictures read out from the hard disk 4 according to the Huffman code held in a Huffman table which is stored in the ROM 18. The inverse quantization circuit 15 obtains a DCT (Discrete Cosine Transform) coefficient by performing an inverse quantization, based on a quantization threshold value held in a quantization table stored in the ROM 19, on results of decoding by the Huffman decoding circuit 14. The IDCT circuit 16 carries out an IDCT for the DCT coefficient obtained by the inverse quantization circuit 15. The MC circuit 17 performs an MC (Motion Compensated prediction) on the results of processing by the IDCT circuit 16.

In this manner, the decoder 5 generates a reproduced image data sequence continuous in a time series manner by decoding the inputted MPEG video stream. It is to be noted that this MPEG video stream is an example of a "first coded data sequence" in the present invention.

Figure 5:
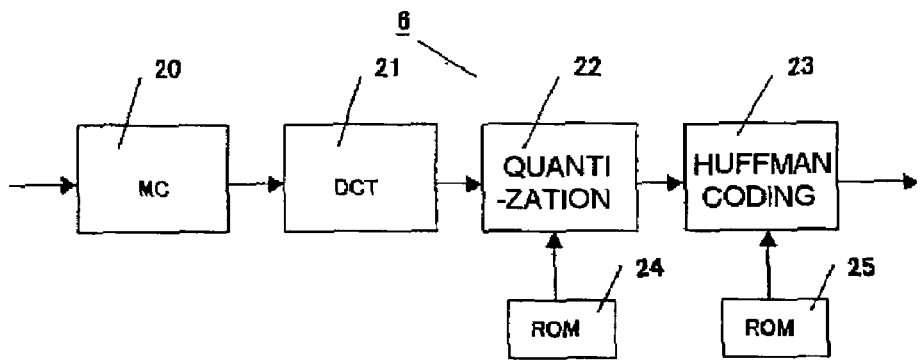
FIG. 5 is a schematic block diagram showing an encoder according to the first embodiment.

FIG. 5 is a block diagram showing a structure of the encoder 6. Referring to FIG. 5, the encoder 6 comprises an MC circuit 20, a DCT circuit 21, a quantization circuit 22, a Huffman coding circuit 23, and ROMs 24 and 25. It is to be noted that the encoder 6 is an example of an "encoder" in the present invention.

The DCT circuit 21 takes in the reproduced image data inputted from the decoder 5 in units of block and generates a DCT coefficient by carrying out a two-dimensional discrete cosine transformation. The quantization circuit 22 quantizes the DCT coefficient by referring to a quantization threshold value held in a quantization table stored in the ROM 24. It is to be noted that the ROM 19 may serve also as the ROM 24.

The Huffman coding circuit 23 generates compressed image data in units of picture by performing a variable-length coding on the quantized DCT coefficient by referring to a Huffman code held in a Huffman table stored in the ROM 25. It is to be noted that the ROM 18 may serve also as the ROM 25.

In this manner, the encoder 6 generates an MPEG video stream by recoding the reproduced image data sequence continuous in a time series manner. It is to be noted that this MPEG video stream is an example of a "second coded data sequence" in the present invention.

Figure 6:
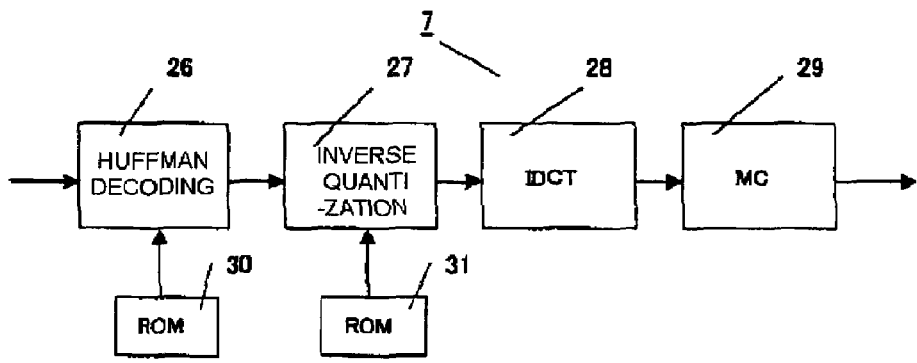
FIG. 6 is a schematic block diagram showing a decoder according to the first embodiment.

FIG. 6 is a block diagram showing a structure of the second decoder 7. Referring to FIG. 6, the second decoder 7 is comprised of a Huffman decoding circuit 26, an inverse quantization circuit 27, an IDCT circuit 28, an MC circuit 29 and ROMs 30 and 31. It is to be noted that the second decoder 7 is an example of the "back-end decoder" in the present invention.

A structure of this second decoder 7 is similar to that of the decoder 5. Thus, a Huffman decoding circuit 26 has the similar circuit structure to that of the Huffman decoding circuit 14, an inverse quantization circuit 27 has the similar circuit structure to that of the inverse quantization circuit 15, an IDCT circuit 28 has the similar circuit structure to that of the IDCT circuit 16, and an MC circuit 29 has the similar circuit structure to that of the MC circuit 17. It is to be noted that other ROM such as the ROM 18 or the ROM 25 may serve also as the ROM 30, and the ROM 19 or the ROM 24 may serve also as the ROM 31.

Figure 7:
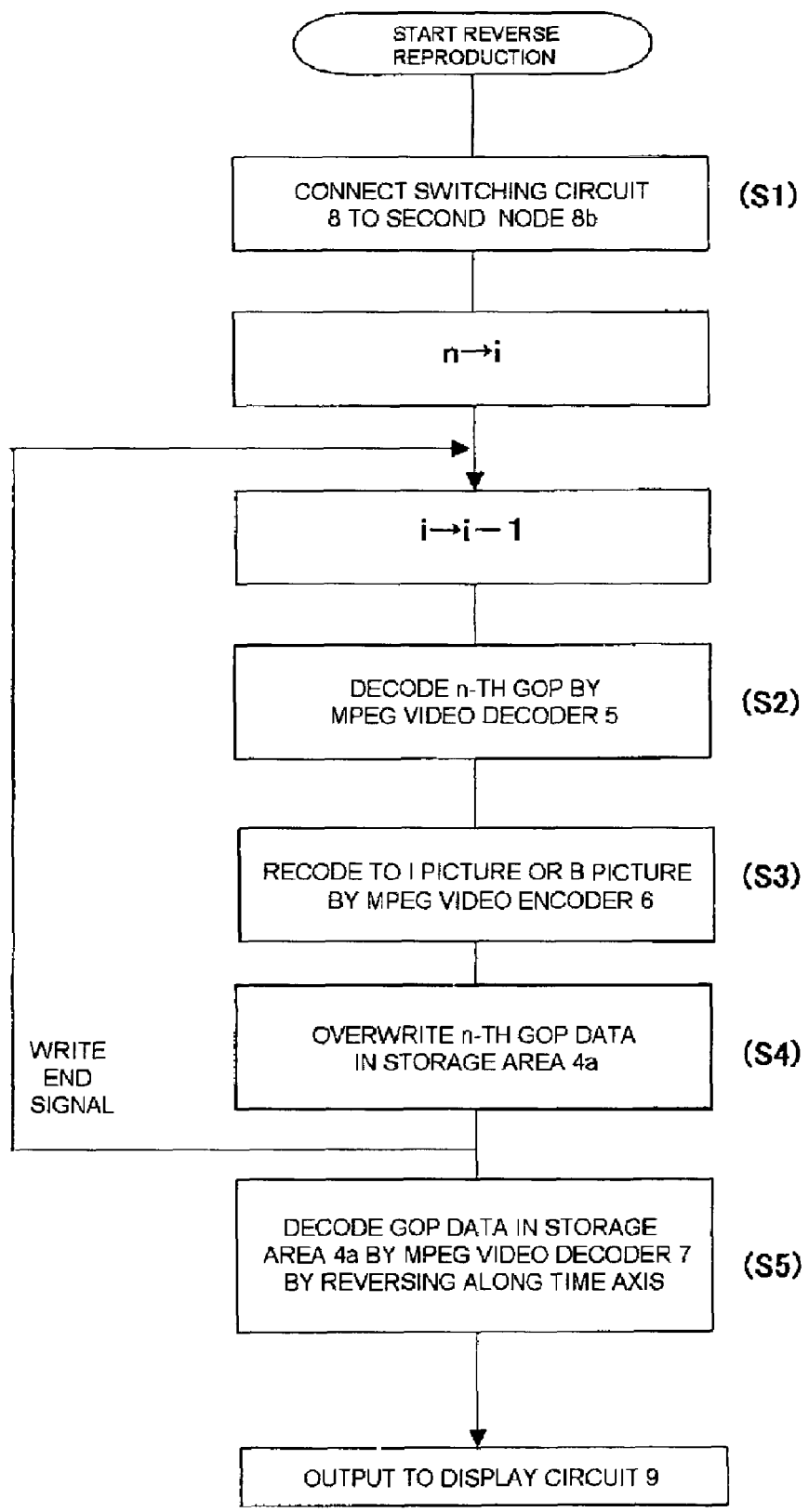
FIG. 7 is a flowchart showing a reverse reproduction operation of the image reproducing apparatus according to the first embodiment.

Based on the above-described structure, an operation of reverse reproduction in the image reproducing apparatus 1 according to the first embodiment will be explained, referring to a flowchart shown in FIG. 7. The operation of the image reproducing apparatus 1 is carried out under the control of the control core circuit 10. Here, it is supposed that an MPEG video stream is comprised of i units of GOPs ($GOP_0$ to $GOP_{i-1}$).

In reverse reproduction, each GOP is processed sequentially from $GOP_{i-1}$ by reversing along the time axis. However, the pictures in each GOP are decoded in the forward direction, namely, in a time-series manner, at the decoder 5. With reverse reproduction instructed, the switching circuit 8 is connected to the second node 8b (S1), the MPEG video stream corresponding to $GOP_{i-1}$ is read out in units of picture from the hard disk 4 and inputted to the decoder 5, and reproduced image data for each picture are generated sequentially in a time series and inputted to the encoder 6 (S2). At the encoder 6, the reproduced image data sequence, for one GOP, inputted from the decoder 5 is recoded into I pictures or B pictures (S3). The recoded data sequence for one GOP from the encoder 6 is overwritten in the storage area 4a of the hard disk 4 (S4).

Upon completion of writing in the storage area 4a, the second decoder 7 reads out the recoded data sequence stored in this storage area 4a in a reverse time-series manner, namely, by going back along the time axis, decodes it sequentially and outputs it to the display circuit 9. With the end of writing in the storage area 4a, a write end signal is sent out, the MPEG video stream corresponding to a next $GOP_{i-2}$ is inputted to the decoder 5, and the processing from S2 onward is performed (S5). Namely, in S5, while the data sequence for one GOP is being decoded at the second decoder 7, the data sequence for the next one GOP is being decoded at the decoder 5. To the display circuit 9, the reproduced image data are inputted in a reverse time-series manner from the second decoder 7, so that the reverse-reproduced pictures are displayed on the display 3.

Figure 8:
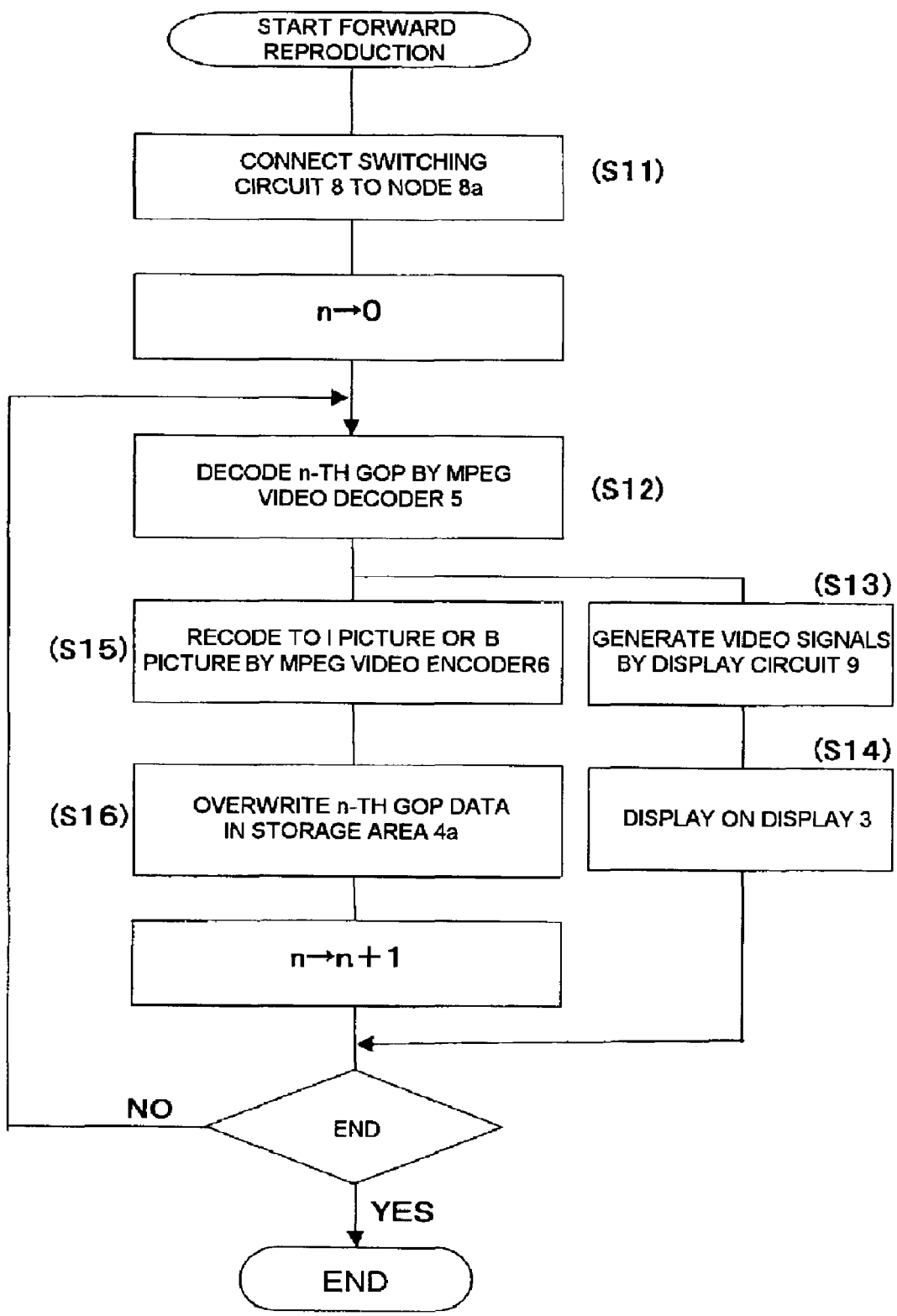
FIG. 8 is a flowchart showing a forward reproduction operation of the image reproducing apparatus according to the first embodiment.

Next, an operation for forward reproduction will be described, referring to a flowchart shown in FIG. 8. Forward reproduction is processed sequentially from $GOP_0$ along the time axis. The pictures within each GOP are, of course, decoded in the forward direction at the decoder 5. With forward reproduction instructed, the switching circuit 8 is connected to the first node 8a (S11), an MPEG video stream corresponding to $GOP_0$ is read out in units of picture from the hard disk 4 and inputted to the decoder 5, and the reproduced image data are generated, in units of picture, sequentially in a time series and inputted in parallel to the encoder 6 and the display circuit 9 (S12). The display circuit 9 generates video signals based on the inputted reproduced image data in units of picture so as to be outputted to the display 3 (S13), thereby the forward reproduced picture is displayed on the display 3 (S14).

On the other hand, the encoder 6, in parallel with a processing of the display circuit 9, recodes reproduced image data sequences, for one GOP, inputted from the decoder 5, into I pictures or B pictures (S15). The recoded data sequence is overwritten in the storage area 4a of the hard disk 4 (S16). Upon completion of the processing of $GOP_0$, the operation returns to S12 and the processing of the next $GOP_1$ is carried out. In other words, during forward reproduction, the encoder 6, in parallel therewith, recodes the same image data sequence sequentially in units of GOP into I pictures or B pictures.

The image reproducing apparatus 1 provides the following operation and effects:

(1) The reproduced image data sequence generated by the decoder 5 is converted to I pictures or B pictures by the encoder 6 and reproduced in reverse order by the second decoder 7. No problem is caused for reverse reproduction because I picture is the intra-frame coded image and because B picture too can be reproduced by only reversing or switching a frame to be front referred to and that to be back referred to. Thus, smooth reverse-order reproduced pictures, as a whole, can be obtained and as a result thereof an image search function of an apparatus equipped with the image reproducing apparatus 1 can be improved.

(2) The data sequence recoded by the encoder 6 corresponds to B pictures where P pictures are converted to these B pictures, in terms of its data amount. Thus, the data amount after the recoding can be reduced by as much as it was saved by the converting of P pictures to B pictures.

(3) Within the hard disk 4 which stores the MPEG video stream from the transfer medium 2, the storage area 4a is allocated to store the recoded data sequence from the encoder 6, so that a lower cost can be achieved than providing a separate storage element.

(4) The recoded data sequence, for one GOP, is overwritten sequentially in the storage area 4a, so that increase in its capacity can be suppressed and increase in the capacity of the hard disk 4 as a whole, too, can be suppressed.

(5) When the data sequence, for one GOP, is being decoded at the second decoder 7, the data sequence for the next GOP is being decoded at the decoder 5, so that the reverse reproduction of pictures for the next GOP can be started as soon as the reverse reproduction of pictures for one GOP is finished, thus making it possible to obtain smooth reverse-reproduced pictures.

(6) During a forward reproduction, the encoder 6, in parallel therewith, is recoding the same image data sequence sequentially in units of GOP into I pictures or B pictures. Therefore, even when a reverse reproduction is instructed during the forward reproduction, the picture switching is carried out smoothly.

Second Embodiment

Figure 9:
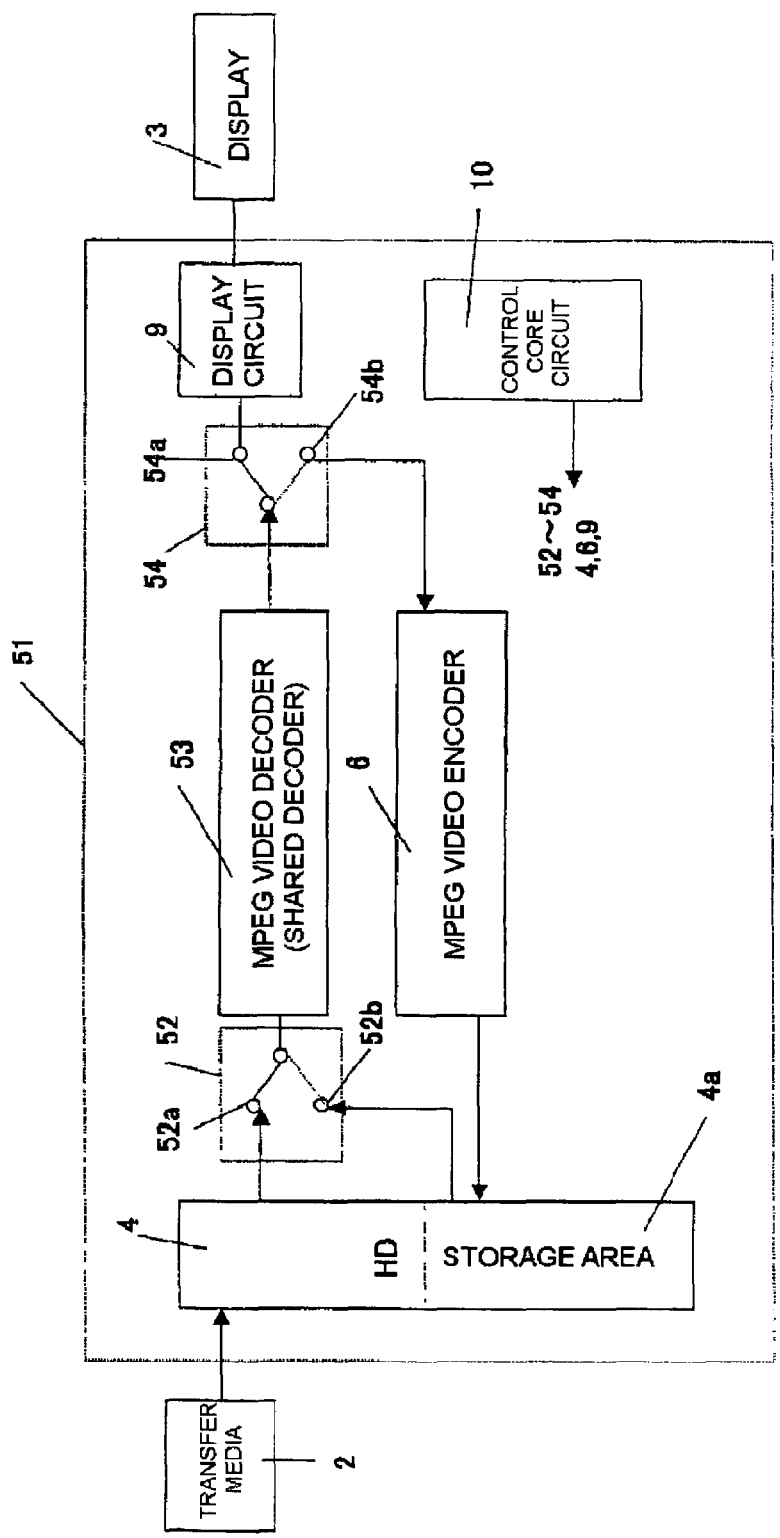
FIG. 9 is a block circuit diagram of an image reproducing apparatus according to a second embodiment.

FIG. 9 shows a block circuit of an image reproducing apparatus 51 according to a second embodiment. The same reference numerals are used for the same component members as are in the first embodiment, and the detailed description thereof will be omitted here.

A feature of this second embodiment lies in the fact that a decoder for first picture data comprised of a plurality of pictures and a decoder for second picture data comprised of a plurality of pictures, which appear at a different processing stage than the first picture data, are put to common use. In the first embodiment, it was described that the structure of the second decoder 7 is similar to that of the decode core circuit 13 in the decoder 5, and in the present embodiment an attention is directed to this point, so that the decoder 5 and the second decoder 7 are put to common use. In FIG. 9, the image reproducing apparatus 51 comprises a hard disk 4, a switching circuit 52, a shared decoder 53, an encoder 6, a second switching circuit 54, a display circuit 9 and a control core circuit 10. The structure of the shared decoder 53 is the same as that of the decoder 5.

An MPEG video stream from the hard disk 4 or a recoded data sequence from the storage area 4a is inputted to the shared decoder 53 via the switching circuit 52, and an output thereof is inputted to the display circuit 9 or the encoder 6 via the second switching circuit 54.

The switching circuit 52 switches its connection to the first node 52a or the second node 52b side according to a control by the control core circuit 10. When the switching circuit 52 is connected to the first node 52a side, the MPEG video stream from the hard disk 4 is inputted to the shared decoder 53. When connected to the second node 52b side, the recoded data sequence from the storage area 4a is inputted to the shared decoder 53.

The second switching circuit 54 switches its connection to the first node 54a or the second node 54b side according to the control by the control core circuit 10. When the second switching circuit 54 is connected to the first node 54a side, the reproduced image data sequence from the shared decoder 53 is inputted to the display circuit 9. When connected to the second node 54b side, the reproduced image data sequence from the shared decoder 53 is inputted to the MPEG encoder 6.

By implementing the above-described structure, the switching circuit 52 is connected to the first node 52a and the second switching circuit 54 to the first node 54a when forward reproduction is performed. Thus, the MPEG video stream from the hard disk 4 is decoded by the shared decoder 53 and inputted, as it is, to the display circuit 9.

At the time of reverse reproduction, on the other hand, the control core circuit 10 first connects the switching circuit 52 to the first node 52a and the second switching circuit 54 to the second node 54b, and in this state the image data for one picture is read out from the hard disk 4. The image data are inputted to the shared decoder 53 through the first node 52a so as to be decoded. Then the reproduced image data for one picture from the shared decoder 53 are inputted to the MPEG encoder 6 via the second node 54b and recoded as an I or B picture.

The control core circuit 10, as soon as the reproduced image data for one picture are sent out from the shared decoder 53 to the MPEG encoder 6, switches the connection of the switching circuit 52 to the second node 52b and that of the second switching circuit 54 to the first node 54a and reads out the recoded data for one picture for reverse reproduction from the storage area 4a. The recoded data are inputted to the shared decoder 53 through the second node 52b and decoded, and the reproduced image data for one picture are inputted to the display circuit 9 via the first node 54a and displayed on a display 3. The control core circuit 10, as soon as the reproduced image data for one picture are sent out from the shared decoder 53 to the display circuit 9, switches the connection of the switching circuit 52 to the first node 52a and that of the second switching circuit 54 to the second node 54b and reads out the image data for one picture from the hard disk 4.

Similarly in the following, the control core circuit 10, whenever the reproduced image data are outputted from the shared decoder 53, switches the node connection state of the switching circuits 52 and 54. The shared decoder 53 performs processings of the decoder 5 and the second decoder 7 in the first embodiment, in a time-sharing manner. In the second embodiment, too, the basic operation of reverse reproduction follows the flow shown in FIG. 7, and that of forward reproduction the flow shown in FIG. 8. In FIG. 7, however, the operation of the decoder 5 and that of the second decoder 7 are replaced by the operation of the shared decoder 53.

In addition to the operation and effects of the first embodiment, the second embodiment realizes the effect of reducing circuit area and lower cost thereby, and furthermore, increasing commodity value is facilitated.

Third Embodiment

Figure 10:
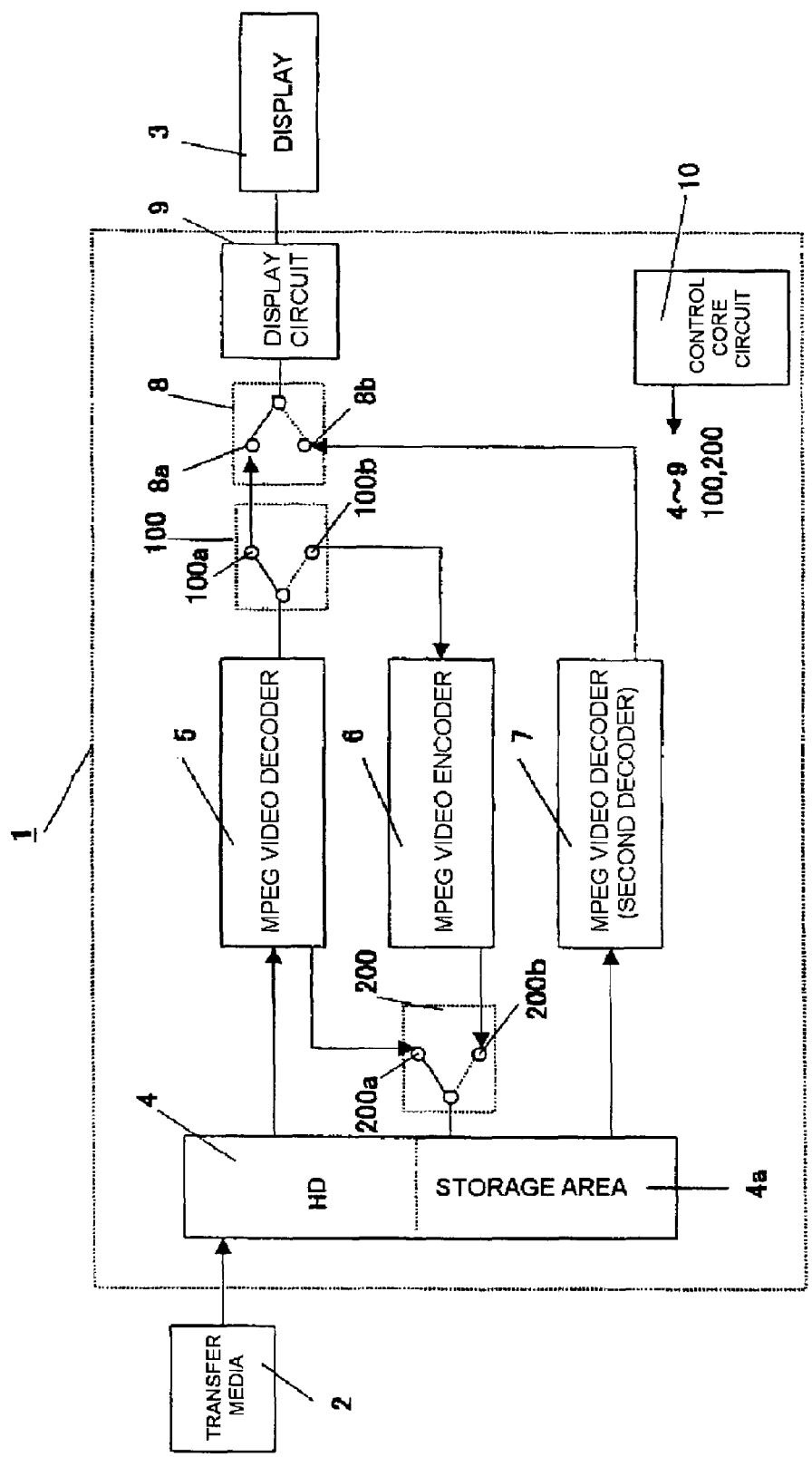
FIG. 10 is a block circuit diagram of an image reproducing apparatus according to a third embodiment.

FIG. 10 shows a block circuit of an image reproducing apparatus 1 according to a third embodiment. While, in the first embodiment, the encoder 6 generates I or B pictures for reverse reproduction, this third embodiment aims to raise the efficiency of the processing. In FIG. 10, the same reference numerals are used for the same component members as are in FIG. 3, and description thereof will be omitted as appropriate. New component members in FIG. 10 are two switching circuits 100 and 200, which are referred to as a second switching circuit 100 and a third switching circuit 200, respectively, in distinction from the switching circuit 8 that has appeared in FIG. 3.

The second switching circuit 100 switches its connection to a first node 100a side or a second node 100b side according to a control by the control core circuit 10. When the second switching circuit 100 is connected to the first node 100a side, reproduced image data generated by the decoder 5 are inputted, as kept intact, to the switching circuit 8. When connected to the second node 100b side, the reproduced image data generated by the decoder 5 are inputted to the encoder 6.

The third switching circuit 200 switches its connection to a first node 200a side or a second node 200b side according to the control by the control core circuit 10. When the third switching circuit 200 is connected to the first node 200a side, predetermined data in the MPEG video stream are stored in the storage area 4a allotted in the hard disk 4. When connected to the second node 200b side, the data generated by the encoder 6 are stored in the storage area 4a.

Figure 11:
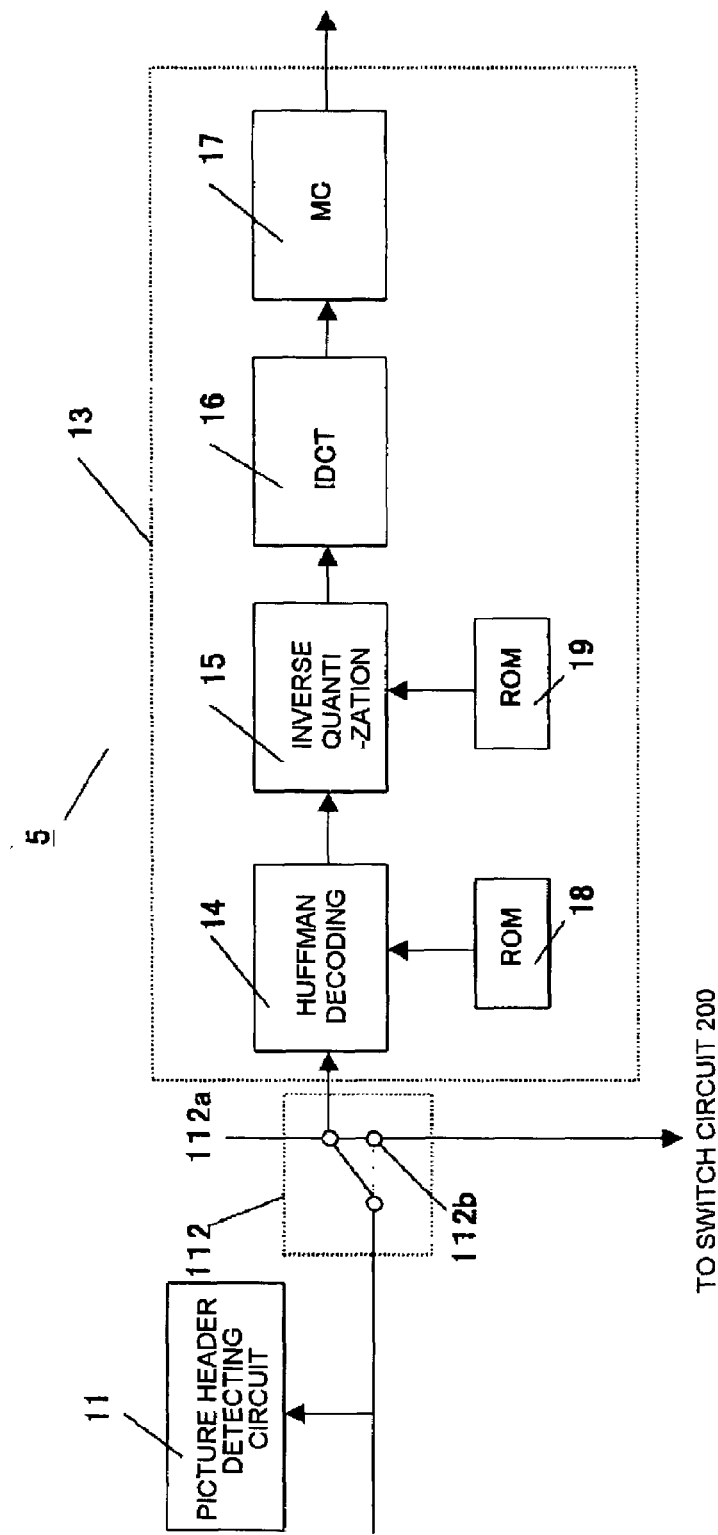
FIG. 11 is a schematic block diagram showing a decoder according to the third embodiment.

FIG. 11 is a block diagram showing a structure of the decoder 5. Different from FIG. 4, a picture header detecting circuit 11 and a picture switching circuit 112 are added, and a portion of FIG. 11 encircled as a decode core circuit 13 corresponds to the decoder 5 shown in FIG. 4. The picture header detecting circuit 11 detects a picture header attached to a header of each picture of a video stream stored in the hard disk 4, and detects a picture type (I, P or B) specified in that portion. The picture switching circuit 112 switches its connection to a first node 112a side or a second node 112b side according to the control by the control core circuit 10. And if the type of picture detected by the picture header detecting circuit 11 is an I picture, the picture will be transferred to the decode core circuit 13 and the third switching circuit 200, with the picture switching circuit connected to the second node 112b side which leads both ways, and if the type of picture is a P or B picture, the picture will be transferred to the decode core circuit 13, with the circuit connected to the first node 112a side. It is to be noted that the picture switching circuit 112 and the third switching circuit 200 are an example of an "allocation processing unit" according to the present invention.

The internal structure of the encoder 6 and the decoder 5 according to this third embodiment may be the same as that shown in FIG. 5 and FIG. 6, respectively. Thus, an MPEG video stream is first converted into a predetermined coded data sequence by the decoder 5 and the encoder 6, which is then sent through the third switching circuit 200 and stored in the storage area 4a allotted in the hard disk 4.

The operation of reverse reproduction according to the structure as described above is shown in a flowchart of FIG. 12. With a reverse reproduction instructed, the switching circuit 8 is connected to the second node 8b (S1). The MPEG video stream, which corresponds to $GOP_{i-1}$, is read out in units of picture from the hard disk 4 and inputted to the decoder 5. Then the type of each picture is determined to be any one of I, P or B by the picture header detecting circuit 11, and, with the operation of the picture switching circuit 112, pictures of all types are decoded by the decode core circuit 13. At the same time, the data of the I pictures are transferred to the third switching circuit 200 too (S2).

Of the data decoded by the decode core circuit 13, the data produced by decoding the P picture and B picture data are inputted to the encoder 6 via the second node 100b of the second switching circuit 100 (S3). The data produced by decoding the I picture data are inputted to the switching circuit 8 via the first node 100a of the second switching circuit 100. At this time, however, the data are entirely discarded because the switching circuit 8 is connected to the second node 8b. Namely, these data are utilized to decode the P picture and B picture data. The encoder 6, according to the instructions from the control core circuit 10, recodes all the data inputted from the decoder 5, including those for P pictures, into B pictures (S4).

The third switching circuit 200, according to a control of the control core circuit 10, inputs the I picture data transferred from the picture switching circuit 112 as well as the recoded data from the encoder 6, which are the B picture data here, to the storage area 4a of the hard disk 4 in a time series manner.

The data, for one GOP, inputted to the storage area 4a are overwritten on the old data (S5). In this manner, the coded data sequence inputted to the storage area 4a from the third switching circuit 200 consists only of I pictures and B pictures, and this coded data sequence is an example of the "second coded data sequence" in the present invention.

Upon completion of writing in the storage area 4a, the second decoder 7 reads out the recoded data stored in this storage area 4a in a reverse time-series manner, decodes them sequentially and outputs them to the display circuit 9 (S6). As described above, B pictures are included in the recoded data sequence, for one GOP, from the encoder 6. Therefore, in order to read out back along the time axis and decode sequentially the recoded data sequence stored in the storage area 4a, the B pictures are decoded by first performing a processing which exchanges a front reference region and a back reference region thereof relative to the input order of the stream and thereafter carrying out the decoding.

With the end of writing in the storage area 4a in S5, a write end signal is sent out, an MPEG video stream, which corresponds to a next $GOP_{i-2}$, is inputted to the encoder 5, and the processing from S2 as described above is performed. Namely, in S6, while the data, for one GOP, is being decoded at the second decoder 7, the data, for the next GOP, is being decoded at the decoder 5.

In addition to the aforementioned embodiments, the image reproducing apparatus 1 according to this third embodiment provides the following effects:

(7) Of the MPEG video stream, the data corresponding to I pictures are not transferred to the encoder 6, so that there is a reduction in the amount of data to be transferred from the decoder 5 to the encoder 6 and, besides, the processing load on the encoder 6 is lightened. As a result, the encoder 6 to be used can be of a low power consumption and small circuit area type.

(8) Of the MPEG video stream, the P pictures are stored in the storage area 4a in a manner such that they are converted to B pictures whose data volume is smaller. Therefore, the capacity of the storage area 4a can be made smaller, which, in turn, can contribute in making the image reproducing apparatus 1 smaller and of lower cost.

Fourth Embodiment

A fourth embodiment is a further compact design version of the third embodiment, and their relationship is the same as that of the second embodiment to the first embodiment. Hereinbelow, the same reference numerals are used for the same component members as are in the third embodiment, and the detailed description thereof will be omitted.

Figure 13:
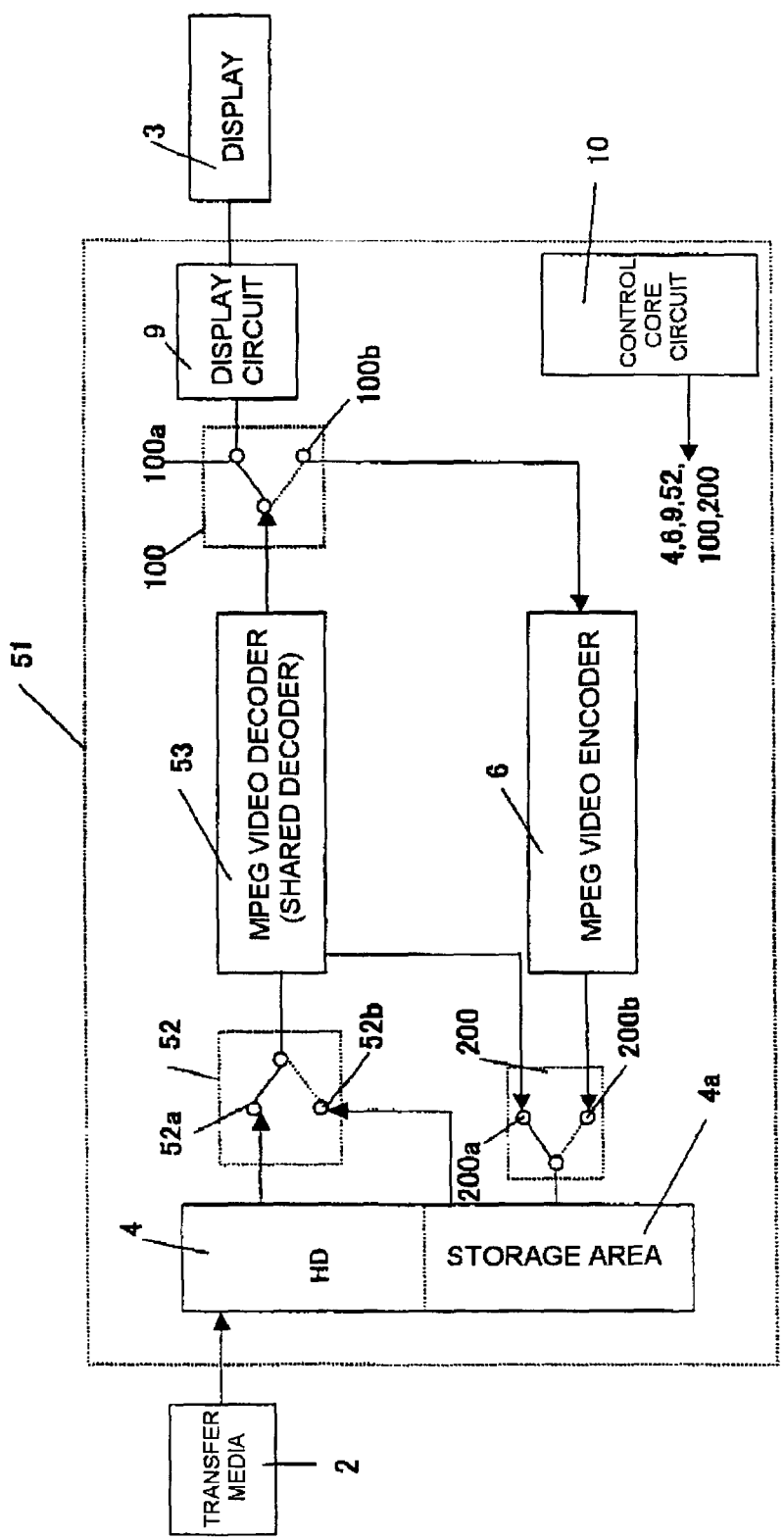
FIG. 13 is a block circuit diagram of an image reproducing apparatus according to a fourth embodiment.

FIG. 13 shows a block circuit of an image reproducing apparatus 51 according to this embodiment. As shown in the same figure, the decode core circuit 13 of the decoder 5 and the second decoder 7 are put to common use. The image reproducing apparatus 51 comprises a hard disk 4, a switching circuit 52, a shared decoder 53, an encoder 6, a second switching circuit 100, a third switching circuit 200, a display circuit 9 and a control core circuit 10. The structure of the shared decoder 53 is the same as that of the decoder 5.

In the image reproducing apparatus 51, an MPEG video stream from the hard disk 4 or recoded data from the storage area 4a are inputted to the shared decoder 53 via the switching circuit 52, and the output thereof is inputted to the display circuit 9 or the encoder 6 via the second switching circuit 54.

When the switching circuit 52 is connected to the first node 52a side, the MPEG video stream from the hard disk 4 is inputted to the shared decoder 53. When connected to the second node 52b side, the recoded data from the storage area 4a are inputted to the shared decoder 53. When the switching circuit 52 is connected to the second node 52b side, the picture switching circuit 112 is connected to the first node 112a irrespective of the type of picture.

Based on the above-described structure, the switching circuit 52 is connected to the first node 52a and the second switching circuit 100 to the first node 100a when forward reproduction is performed. Thus, the MPEG video stream from the hard disk 4 is decoded by the shared decoder 53 and inputted, as it is, to the display circuit 9.

At the time of reverse reproduction, on the other hand, the control core circuit 10 first connects the switching circuit 52 to the first node 52a and the second switching circuit 100 to the second node 10b, and in this state the image data for one picture are read out from the hard disk 4. The image data are inputted to the switching circuit 112 of the shared decoder 53 through the first node 52a and then, according to the type of picture, inputted to the decode core circuit 13 or the third switching circuit 200.

The control core circuit 10, as soon as the reproduced image data for one picture are sent out from the shared decoder 53 to the third switching circuit 200 or the MPEG encoder 6, switches the connection of the switching circuit 52 to the second node 52b and that of the second switching circuit 100 to the first node 10a and reads out the recoded data for one picture for reverse reproduction from the storage area 4a. The recoded data are inputted to the shared decoder 53 through the second node 52b and decoded. The decoded data are inputted to the display circuit 9 via the first node 100a and displayed on the display 3.

The control core circuit 10, as soon as the reproduced image data for one picture are sent out from the shared decoder 53 to the display circuit 9, switches the connection of the switching circuit 52 to the first node 52a and that of the second switching circuit 100 to the second node 100b and reads out the image data for one picture from the hard disk 4.

Similarly in the following, the control core circuit 10, whenever the reproduced image data are outputted from the shared decoder 53, switches the node connection state of the switching circuits 52 and 100. By so doing, the shared decoder 53 performs processings of the decoder 5 and the second decoder 7 in the third embodiment, in a time-sharing manner.

Figure 12:
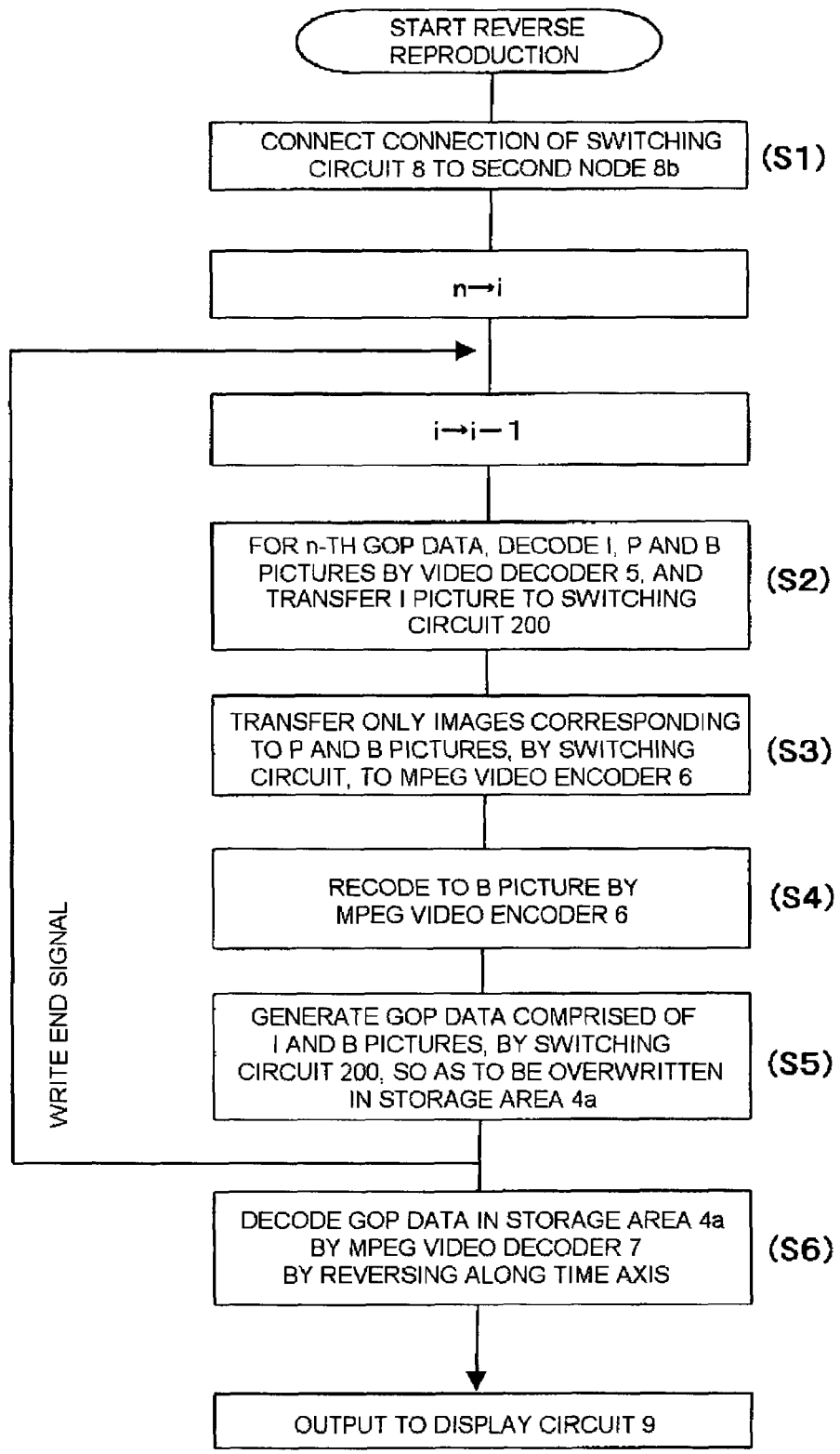
FIG. 12 is a flowchart showing a reverse reproduction operation of an image reproducing apparatus according to the third embodiment.

A basic operation of reverse reproduction in the fourth embodiment follows the flow shown in FIG. 12. In FIG. 12, however, the operation of the decoder 5 and that of the second decoder 7 are replaced by the operation of the shared decoder 53. In addition to the operation and effects of the third embodiment, this fourth embodiment realizes the reduction in circuit area by putting the decoder 5 and the second decoder 7 to common use.

Fifth Embodiment

Figure 14:
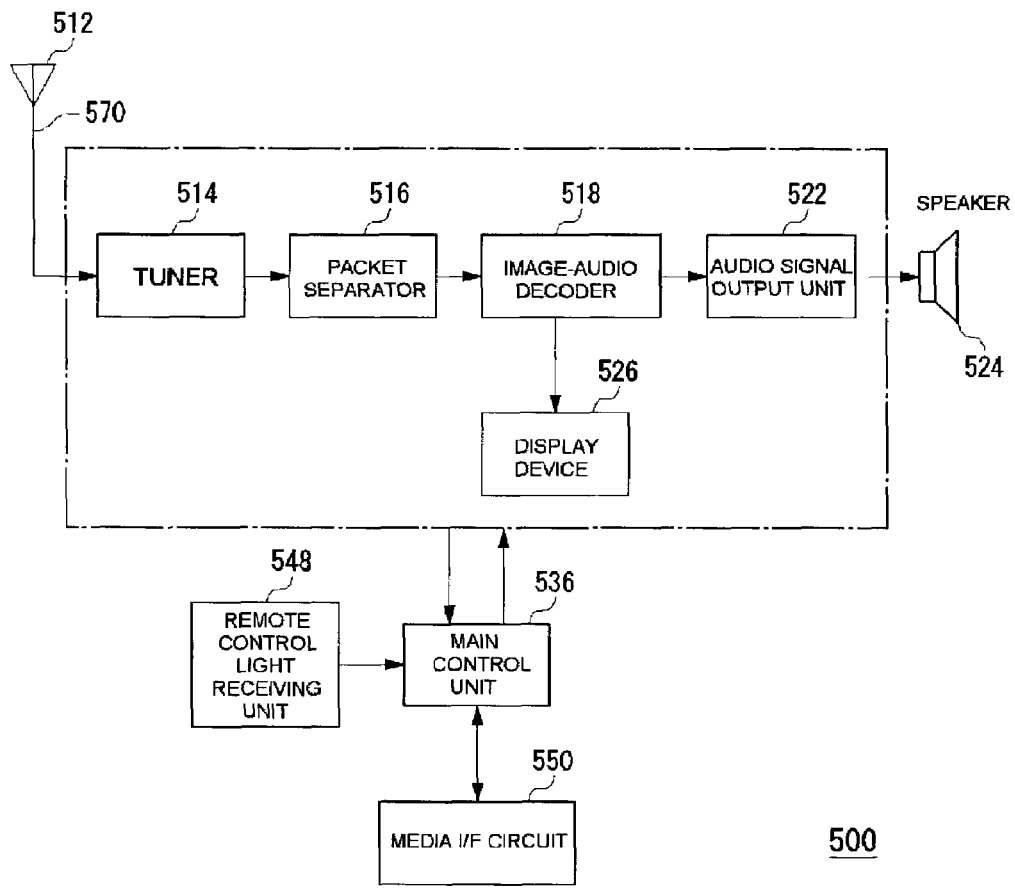
FIG. 14 is a structural diagram of a television receiver according to a fifth embodiment where the image reproducing apparatus or the image processing apparatus according to any of the present embodiments is incorporated.

A fifth embodiment relates to a case in which the image reproducing apparatus or the image processing apparatus according to any of the above-described embodiments is incorporated into a television receiver. FIG. 14 is its structural diagram.

In a television receiver 500, broadcast waves 570 are provided to a tuner 514 via an antenna 512. The tuner 514 selects a transponder including a channel selected by a user and performs QPSK demodulation thereon. A stream containing a plurality of transport pockets obtained by the demodulation is sent to a packet separator 516. The packet separator 516, which is a demultiplexer, separates packets corresponding to a desired channel and outputs them to an image-audio decoder 518.

The image-audio decoder 518, which is an MPEG decoder, incorporates the image reproducing apparatus or the image processing apparatus according to any of the above-described embodiments for its image processing. The image-audio decoder 518 decodes the inputted packets and outputs audio data to an audio signal output unit 522 and image data to a display device 526. The audio signal output unit 522 carries out a predetermined processing on the inputted audio data, and the audio is finally outputted to a speaker 524.

A main control unit 536, which is comprised of a control core circuit 10, a CPU and so forth, controls each part in an overall and supervised manner according to instructions from the user. The instructions from the user are inputted via a remote control light receiving unit 548, which receives signals from, for example, a remote controller which is not shown here. A media I/F circuit 550 reads multimedia data or programs from an IC card, MO, CD-ROM, DVD-ROM or other record media, which are not shown here, into a main control unit 536.

By implementing the above-described structure, image reproduction processings, including forward reproduction and reverse reproduction, are realized in accordance with the instructions from the user. Then, the operation and effects described above can be provided.

General View and Examination on the Embodiments

As is naturally understood by those skilled in the art, arbitrary combinations of the embodiments, which have not been described herein, are possible. For example, the following consideration or modifications are possible:

(a) As the hard disk 4, a magneto-optical disk, optical disk or the like is used in place of a magnetic disk.

(b) As the hard disk 4, a rewritable semiconductor memory, such as SDRAM (Synchronous Dynamic RAM), DRAM or Rambus DRAM, is used.

(c) A hard disk 4 and a storage area 4a are provided independently. In this case, the storage area 4a is preferably a rewritable semiconductor memory.

(d) From the MPEG video stream, the data sequence is taken out not in one GOP but in the following units. The following units, including GOP, are included in the concept of units of group.

Units starting from an I picture are not taken as GOP, but the units starting from, for example, a P picture are to be taken as GOP.

Without adhering to the concept of GOP, groups of several pictures are to be units of group.

The number of pictures is arbitrarily changed group by group.

(e) RAM (Random Access Memory) is used in place of ROMs 18, 19, 24, 25, 30 and 31.

(f) An operation key to select a reverse reproduction function described in the first and third embodiments is provided in the image reproducing apparatus.

(g) Reverse reproduction is carried out frame by frame according to the key operation.

(h) In the first and second embodiments, I picture or pictures of a next GOP added to each GOP is/are not recoded and is/are discarded in order not to be overlapped with a picture of the next GOP. There may be provided a structure in which this I picture together with other picture are recoded and then discarded.

(i) In each of the embodiments described above, pictures included in a recoded data sequence generated by the encoder 6 are written in a time series order into the storage area 4a. However, this data sequence may be written into the storage area 4a while it is rearranged into a reverse time-series order. In this case, the second decoder 7 is not required to read out the recoded data sequence in a reverse time-series manner from the storage area 4a. Moreover, at the time of writing into the storage area 4a, a data sequence, of a B picture, to be front referred may be replaced with a data sequence, of the B picture, to be back referred, or vice versa.

(j) In addition to the above-described embodiments, there are the following modes as applications in which two coding or decoding functions are provided within a single apparatus. Thus, though in the aforementioned second and fourth embodiments an example was described in which the decoder 5 and the second decoder 7 are put to common use as the shared decoder 53, encoders may be put to common use in a case where two encoders are provided.

(i) A case where in a movie camera a subject is shot simultaneously from different angles and the data are compressed-expanded in an MPEG system.

(ii) A case where in television a plurality of programs are decoded simultaneously and are two-screen displayed.

(iii) A case where in television a plurality of programs are decoded simultaneously and channel switching is made seamlessly. In the broadcast using MPEG, once the decoding is interrupted for channel switching and the like, a little time, or a period of 0.5 to 2 seconds before a new sequence header is detected, is necessary before the decoding is resumed next. Normally, during this period, the picture freezes or suffers a blackout. (iii) is effective in solving this problem.

(iv) In a television connected with a DVD, digital still camera or the like, the broadcast together with the DVD and digital still camera are reproduced simultaneously.

(v) A case in which, during the reproduction of a program, the program or another program on a different channel is recorded in the state of a moving picture or still picture, and at the same time the recorded moving picture or still picture and the program being broadcast are superimposed and reproduced simultaneously.

(vi) A case in which reproduced images are coded in a JPEG system at certain time intervals and taken into a ring buffer, so that these can be used as an index for a jump to a near scene in a reverse search.

(k) For reverse reproduction, it was necessary that the image data for one GOP be held, just as they are, in the storage area 4a. This is because the data within a GOP are read out only in the forward direction and thus, without all the data for one GOP remaining, the pictures can not be generated in reverse reproduction. For this reason, it is required that the storage area 4a shall have a capacity for recording the image data for one GOP. Such a structure, however, is put to effective use, so that in the first embodiment and others the encoder 6 is made to run free even during forward reproduction so as to constantly generate and maintain the data for reverse reproduction for one GOP. This arrangement is intended to effect smooth switching from forward to reverse reproduction.

Though this method realizes smoother switching of reproduction directions than when there is no free run of the encoder 6, it is not necessarily without a time lag at the switching. This is because when a reverse reproduction is being performed for $GOP_n$, the decoder 5 needs to read out and decode the coded data for one GOP for the preceding $GOP_{n-1}$ and therefore there are possibilities that a series of processings might not be finished before the completion of reverse reproduction of $GOP_n$. Should it not be finished, the reverse reproduction will come to a stop momentarily.

As a countermeasure to this, the time lag at the switching from forward reproduction to reverse reproduction can be eliminated completely by expanding the storage of the image data for one GOP as described in the first embodiment and others and thus by storing the image data for a maximum of about two GOPS. Accordingly, it suffices to take this countermeasure in a case where such specifications are required.

When the number of pixels is to be reduced, decoding in a down conversion format may be carried out beforehand by the IDCT processing at the decoder 7. Namely, while under the normal circumstances the IDCT processing is performed on the square block of, for example, 8×8 pixels, the IDCT may be performed on 8×4 pixels, that are, the ½ size block. In that case, since the capacity of the image data to be stored in a frame memory in image reproduction becomes ½, the thus emptied area can be used to store pictures for the above-described two GOPS. With this down conversion performed, however, the images of 1960×1080 pixels in high-definition mode will become those of 980×1080 pixels. Thus, in their reproduction, some resolution restoration processing, such as displaying each pixel twice horizontally, is to be carried out.

(l) The above-described time lag at the switching must be taken into account also for the switching from reverse reproduction to forward reproduction. In this case, too, a similar step, namely, storage of read-in picture data for about one to two GOPs, is taken to be able to cope with this case. Suppose that the nth $GOP_n$ is now being read-in processed for reverse reproduction, then the picture data for this $GOP_n$ are held until the read-out for reverse reproduction reaches $GOP_{n-2}$, which is the GOP two GOPs before it. Namely, uninterrupted reproduction, even at the switching to forward reproduction, is realized by holding certain GOP data until the read-out of the data two GOPs before it.

The switching from reverse reproduction to forward reproduction, which can be handled by the processing at the decoder 5 only, has basically a smaller time lag than the case in (k) above. Accordingly, it seems that in actual applications, data for a little over one GOP, instead of the data for two GOPs as mentioned here, will suffice. However, it is desirable that this value be determined by experiment or the like on each model because it may vary with equipment implementation.

Figure 15:
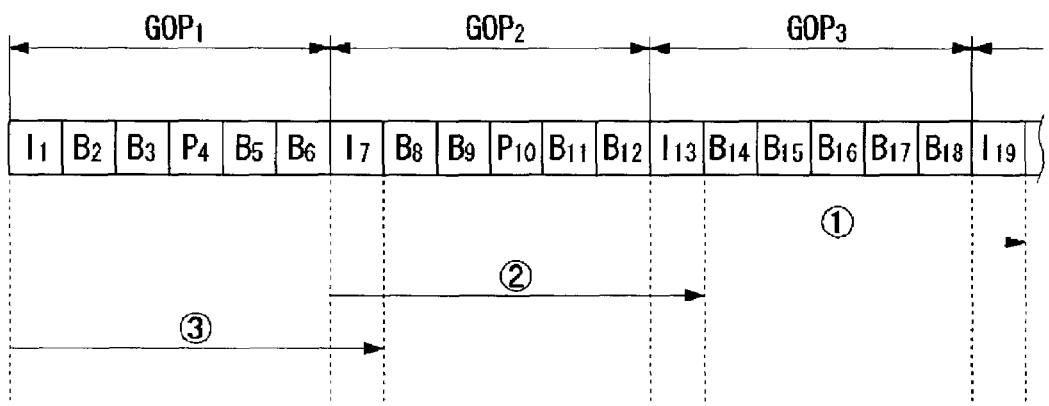
FIG. 15 is provided for explaining reverse reproduction whose speed is made faster by the caching of I pictures.

(m) FIG. 15 explains an arrangement for high-speed reverse reproduction by placing I pictures in a cache memory. Attention is directed to a point where the I pictures are "reuse type pictures." In the same figure, for the simplicity of explanation, there are six pictures in one GOP, and the sequences of pictures in three GOPs of $GOP_1$ to $GOP_3$ are expressed as $I_1$ through $B_6$ for $GOP_1$, $I_7$ through $B_{12}$ for $GOP_2$, and $I_{13}$ through $B_{18}$ for $GOP_3$.

Suppose a reverse reproduction is now requested from $GOP_3$, then, as mentioned above, the read-out (1) of $GOP_3$, the read-out (2) of $GOP_2$ and the read-out (3) of $GOP_1$ are carried out in this order. Here let us direct the attention to the processing of $GOP_2$. The first picture, or $I_{13}$, of $GOP_3$ is being read out in order to reproduce the last picture, or $B_{12}$. Yet, it turns out that the picture I13 has already been read out once and decoded at the reverse reproduction of $GOP_3$. This indicates that if the decoded data of the first I picture of each GOP are cached in the storage area 4a or some other memory until the processing of a previous GOP in the MPEG data stream is completed, then trouble of decoding the picture by again reading it out will be saved. This caching can improve the processing efficiency of reverse reproduction.

(n) In many of the embodiments, the coded data for reverse reproduction are obtained by generating I pictures by the recoding by the encoder 6 and, occasionally, combining them with B pictures. However, the method is not limited to this only, and other modes may be selected by those skilled in the art at their implementing stage, in which, for instance, the encoder 6 eventually generates more I pictures than the I pictures contained in the MPEG video stream at the outset.

Changing the viewpoint, the encoder 6 may code the image data into a picture sequence of a type in which other picture of at most one is referred to for each prediction direction. The "prediction direction" is either forward direction or reverse direction, which is the former being prediction from the past or the latter from the future, respectively. Therefore, the pictures that make reference to zero or one picture only in forward and reverse directions are acceptable here.

In the current MPEG, the I-pictures and B pictures meet this condition. The essence of a question as to what kind of pictures are to be generated in the recoding lies basically in a structure necessary for forward reproduction, especially in one capable of realizing reverse reproduction while keeping the memory capacity. In the MPEG, there are cases where the P picture makes reference to a plurality of fairly far-off pictures in the forward direction, and yet, in forward reproduction, it is not necessary to hold many pictures because the decoded pictures are outputted or displayed sequentially. Conversely speaking, while, just because of the nature of forward reproduction, the P pictures can be smoothly reproduced with a relatively small frame buffer, in reverse reproduction a large number of pictures for the reproduction of the P pictures must be stored for a considerable period of time duration. Therefore, in actuality, the pictures that make reference to two or more pictures in the same prediction direction require a relatively large memory capacity for the reverse reproduction only, thus being disadvantageous in terms of cost, implementing area and so forth. Hence, it is considered necessary and sufficient for solving the problem if the picture of at most one picture is accepted for the same prediction direction, including I and B pictures.

By implementing the present embodiments according to the present invention, a highly efficient image processing technology by which to carry out very smooth reverse reproduction is provided.

Although the present invention has been described by way of exemplary embodiments, it should be understood that many changes and substitutions may be made by those skilled in the art without departing from the scope of the present invention which is defined by the appended claims.

What is claimed is:

1. An image processing apparatus, comprising:
    a converter which converts a first coded data sequence, which includes I pictures, P pictures and B pictures coded in compliance with MPEG, to a second coded data sequence including I pictures and B pictures but not P pictures;
    a back-end decoder which decodes the second coded data sequence, generated by said converter, in a reverse time-series manner; and
    a controller which controls operations of said converter and decoder,
    said converter including:
        a front-end decoder which decodes at least the P pictures among the first coded data sequence;
        an encoder which codes data, decoded by said front-end decoder, as B pictures according to MPEG; and
        a storage which stores the second coded data sequence.

2. An image processing apparatus according to claim 1, further comprising an allocation controller which allocates I pictures included in the first coded data sequence, as the I pictures included in the second coded data sequence, wherein said allocation controller allocates the I pictures, as they are, without being subjected to processings by said front-end decoder and said encoder.

3. An image processing apparatus according to claim 2, wherein the first coded data sequence are data coded in a manner that the pictures are allocated in a predetermined sequence, in a predetermined unit of group, and each processing by said converter and said back-end decoder is performed in the predetermined unit of group, and wherein said converter codes, as B pictures, image data obtained by decoding P pictures among a coded data sequence of a certain group, by referring to I pictures included in said certain group and I pictures included in a next group thereto.

4. An image processing apparatus according to claim 1, wherein the first coded data sequence are data coded in a manner that the I pictures, P pictures, and B pictures are allocated in a predetermined sequence, in a predetermined unit of group, and each processing by said converter and said back-end decoder is performed in the predetermined unit of group, and wherein said converter codes, as B pictures, image data obtained by decoding P pictures among a coded data sequence of a certain group, by referring to I pictures included in said certain group and I pictures included in a next group thereto.

5. An image processing apparatus according to claim 1, wherein said back-end decoder reads out the second coded data sequence in a reverse time-series manner and performs a reverse time-series decoding in a manner such that, as to B pictures included in the second coded data sequence, pictures to be front referred to and those to be back referred to are reversed.

6. An image processing apparatus according to claim 1, wherein said encoder stores the second coded data sequence in said storage in a reverse time-series order and performs a reverse time-series decoding in a manner that B pictures included in the second coded data sequence are so coded that pictures to be front referred to and those to be back referred to are reversed.

7. A television receiver equipped with an image processing apparatus according to claim 1, wherein reproduction of images in a reverse time-series manner is included as part of operational specifications thereof.

8. An image processing apparatus, comprising:
    a converter which converts a first coded data sequence, which includes I pictures, P pictures and B pictures coded in compliance with MPEG, to a second coded data sequence including I pictures and B pictures but not P pictures;
    a back-end decoder which decodes the second coded data sequence, generated by said converter, in a reverse time-series manner; and
    a controller which controls operations of said converter and decoder,
    said converter including:
        a front-end decoder which decodes at least the B pictures and P pictures among the first coded data sequence;
        an encoder which codes data, decoded by said front-end decoder, as B pictures according to MPEG; and
        a storage which stores the second coded data sequence.

9. An image processing apparatus according to claim 8, further comprising an allocation controller which allocates I pictures included in the first coded data sequence, as the I pictures included in the second coded data sequence, wherein said allocation controller allocates the I pictures, as they are, without being subjected to processings by said front-end decoder and said encoder.

10. An image processing apparatus according to claim 9, wherein the first coded data sequence are data coded in a manner that the pictures are allocated in a predetermined sequence, in a predetermined unit of group, and each processing by said converter and said back-end decoder is performed in the predetermined unit of group, and wherein said converter codes, as B pictures, image data obtained by decoding P pictures among a coded data sequence of a certain group, by referring to I pictures included in said certain group and I pictures included in a next group thereto.

11. An image processing apparatus according to claim 9, wherein the first coded data sequence are data coded in a manner that the pictures are allocated in a predetermined sequence, in a predetermined unit of group, and each processing by said converter and said back-end decoder is performed in the predetermined unit of group, and wherein said converter codes, as B pictures, image data obtained by decoding B pictures and P pictures among a coded data sequence of a certain group, by referring to I pictures included in said certain group and I pictures included in a next group thereto.

12. An image processing apparatus according to claim 8, wherein the first coded data sequence are data coded in a manner that the I pictures, P pictures, and B pictures are allocated in a predetermined sequence, in a predetermined unit of group, and each processing by said converter and said back-end decoder is performed in the predetermined unit of group, and wherein said converter codes, as B pictures, image data obtained by decoding P pictures among a coded data sequence of a certain group, by referring to I pictures included in said certain group and I pictures included in a next group thereto.

13. An image processing apparatus according to claim 8, wherein the first coded data sequence are data coded in a manner that the I pictures, P pictures, and B pictures are allocated in a predetermined sequence, in a predetermined unit of group, and each processing by said converter and said back-end decoder is performed in the predetermined unit of group, and wherein said converter codes, as B pictures, image data obtained by decoding B pictures and P pictures among a coded data sequence of a certain group, by referring to I pictures included in said certain group and I pictures included in a next group thereto.

14. An image processing apparatus according to claim 8, wherein said back-end decoder reads out the second coded data sequence in a reverse time-series manner and performs a reverse time-series decoding in a manner such that, as to B pictures included in the second coded data sequence, pictures to be front referred to and those to be back referred to are reversed.

15. An image processing apparatus according to claim 8, wherein said encoder stores the second coded data sequence in said storage in a reverse time-series order and performs a reverse time-series decoding in a manner that B pictures included in the second coded data sequence are so coded that pictures to be front referred to and those to be back referred to are reversed.

16. A television receiver equipped with an image processing apparatus according to claim 3, wherein reproduction of images in a reverse time-series manner is included as part of operational specifications thereof.

* * * * *